(12) United States Patent
Lee et al.

(10) Patent No.: US 12,234,596 B2
(45) Date of Patent: Feb. 25, 2025

(54) WASHING MACHINE

(71) Applicant: Samsung Electronics Co., Ltd., Suwon-si (KR)

(72) Inventors: Kyunam Lee, Suwon-si (KR); Youngjin Um, Suwon-si (KR); Younghyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/056,865

(22) Filed: Nov. 18, 2022

(65) Prior Publication Data

US 2023/0080493 A1    Mar. 16, 2023

Related U.S. Application Data

(63) Continuation of application No. PCT/KR2021/005781, filed on May 10, 2021.

(30) Foreign Application Priority Data

May 18, 2020   (KR) .................. 10-2020-0058922

(51) Int. Cl.
*D06F 37/30*     (2020.01)
*D06F 23/04*     (2006.01)
(Continued)

(52) U.S. Cl.
CPC ............ *D06F 37/304* (2013.01); *D06F 23/04* (2013.01); *D06F 34/20* (2020.02); *D06F 37/12* (2013.01);
(Continued)

(58) Field of Classification Search
CPC .................................................. D06F 37/304
See application file for complete search history.

(56) References Cited

U.S. PATENT DOCUMENTS 6,568,018 B1    5/2003  Chamberlin et al.
11,239,738 B2   2/2022  Yang et al.

FOREIGN PATENT DOCUMENTS

JP    H10-057657 A    3/1998
KR    20-0152466 Y1   7/1999
(Continued)

OTHER PUBLICATIONS

International Search Report of the International Searching Authority dated Aug. 27, 2021, in connection with International Application No. PCT/KR2021/005781, 8 pages.

*Primary Examiner* — Jason Y Ko

(57) ABSTRACT

A washing machine includes a water tank provided to store washing water in a cabinet, a rotating tub rotatably provided in the water tank, a pulsator provided in the rotating tub and rotated by a washing shaft, a driving motor configured to generate a rotational force for rotating the washing shaft, a clutch configured to selectively transmit the rotational force generated by the driving motor to a dewatering shaft for rotating the rotating tub and includes a housing through which the washing shaft and the dewatering shaft pass, a pulley including a first pulley rotated by the driving motor and a second pulley connected to the washing shaft, is connected to the first pulley by a belt, and configured to rotate the washing shaft, a bracket coupled to the second pulley and to which magnets are fixed, and a sensor unit coupled to the housing and configured to detect the number of rotations of the driving motor by detecting the magnets.

15 Claims, 35 Drawing Sheets

(51) Int. Cl.
*D06F 34/20* (2020.01)
*D06F 37/12* (2006.01)
*D06F 37/40* (2006.01)
*H02K 7/10* (2006.01)
*H02K 7/108* (2006.01)
*H02K 11/21* (2016.01)
*D06F 103/24* (2020.01)

(52) U.S. Cl.
CPC ........... *D06F 37/40* (2013.01); *H02K 7/1004* (2013.01); *H02K 7/108* (2013.01); *H02K 11/21* (2016.01); *D06F 2103/24* (2020.02)

(56) References Cited

FOREIGN PATENT DOCUMENTS

| | | |
|---|---|---|
| KR | 10-2002-0058548 A | 7/2002 |
| KR | 10-2005-0037692 A | 4/2005 |
| KR | 10-2015-0099386 A | 8/2015 |
| KR | 10-2017-0130798 A | 11/2017 |

WASHING MACHINE

CROSS-REFERENCE TO RELATED APPLICATIONS

This application is a Bypass Continuation of International Application No. PCT/KR2021/005781, filed May 10, 2021, which claims priority to Korean Patent Application No. 10-2020-0058922, filed May 18, 2020, the disclosures of which are herein incorporated by reference in their entirety.

BACKGROUND

1. Field

The present invention relates to a washing machine with improved positioning of a sensor and a magnet for detecting the number of rotations of a driving motor.

2. Description of Related Art

Washing machines are apparatuses for washing clothes using electric power and may be mainly divided into drum washing machines and fully automatic washing machines.

Generally, a fully automatic washing machine may include a water tank that stores washing water, a rotating tub rotatably installed in the water tank, a pulsator rotatably installed on a bottom of the rotating tub, a driving motor for rotatably driving the rotating tub and the pulsator, and a clutch that selectively allows the rotating tub to rotate.

The washing machine may use an AC motor having a structure in which two directions are fixed to improve the washing and dewatering performance.

In the case of the AC motor, a speed controller could be additionally assembled to adjust a speed but may be difficult to apply to old or low-cost models. Since the number of rotations of the AC motor may not be controlled in old or low-cost models, there may be a problem of difficulty in detecting revolutions per minute (RPM).

SUMMARY

The present disclosure is directed to providing a washing machine in which a bracket to which a magnet for detecting the number of rotations of a driving motor is fixed is detachably coupled to a pulley positioned under a clutch.

In addition, the present disclosure is directed to providing a washing machine in which a sensor unit that detects a magnet is coupled to a housing of a clutch.

An aspect of the present disclosure provides a washing machine including a water tank provided to store washing water in a cabinet, a rotating tub rotatably provided in the water tank, a pulsator provided in the rotating tub and rotated by a washing shaft, a driving motor configured to generate a rotational force for rotating the washing shaft, a clutch configured to selectively transmit the rotational force generated by the driving motor to a dewatering shaft for rotating the rotating tub and includes a housing through which the washing shaft and the dewatering shaft pass, a pulley including a first pulley rotated by the driving motor and a second pulley connected to the washing shaft and connected to the first pulley by a belt, and configured to rotate the washing shaft, a bracket that is coupled to the second pulley and to which magnets are fixed, and a sensor unit coupled to the housing and configured to detect the number of rotations of the driving motor by detecting the magnets.

The bracket may be provided in a ring shape and may include a plurality of hooks detachably coupled to the second pulley and a plurality of magnet mounts that are formed along an edge of the bracket and to which the magnets are fixed.

Each of the magnets may be provided in a trapezoidal shape having a short side and a long side and detachably fixed to one of the plurality of magnet mounts.

Each of the magnets may be fixed to one of the plurality of magnet mounts so that the short side is oriented toward a center of the bracket.

The magnets may be fixed to the bracket to be positioned on the second pulley.

The sensor unit may include a coupler including a plurality of coupling holes coupled to the housing and a sensor mount that extends from the coupler toward the second pulley and a sensor fixed to the sensor mount and configured to detect the magnets.

The sensor may be fixed to an end of the sensor mount to be positioned on the bracket.

A distance between the sensor and the magnet may be in the range of 2 to 4 mm.

The clutch may include a spring clutch having an inner diameter that decreases or increases to selectively transmit a rotational force to the dewatering shaft, a sleeve clutch provided to surround an outer circumferential surface of the spring clutch, and configured to rotate in two directions, and decrease or increase the inner diameter of the spring clutch, a lever clutch configured to rotate the sleeve clutch in the two directions, and a brake lever driven by a drain motor and configured to rotate the lever clutch to rotate the sleeve clutch in the two directions.

The clutch may further include a clutch boss accommodated at an inner lower end of the spring clutch and connected to the washing shaft and a case gear accommodated at an inner upper end of the spring clutch to be disposed on the clutch boss and connected to the dewatering shaft.

The sleeve clutch may include a first sleeve clutch provided to surround a lower end portion of the outer circumferential surface of the spring clutch and configured to connect to or disconnect from the clutch boss according to a decrease or increase in inner diameter of a lower end portion of the spring clutch and a second sleeve clutch provided to surround an upper end portion of the outer circumferential surface of the spring clutch and configured to connect to or disconnect from the case gear according to a decrease or increase in inner diameter of an upper end portion of the spring clutch.

The clutch may further include an arm clutch including a first arm clutch coupled to the lever clutch and configured to rotate the first sleeve clutch and a second arm clutch coupled to the lever clutch and configured to rotate the second sleeve clutch.

The sleeve clutch may be provided to surround a lower end portion of the outer circumferential surface of the spring clutch and configured to connect to or disconnect from the clutch boss according to a decrease or increase in inner diameter of a lower end portion of the spring clutch.

An upper end portion of the spring clutch may be connected to the case gear while maintaining a state in which an inner diameter of the upper end portion of the spring clutch decreases.

The clutch may further include an arm clutch which is coupled to the lever clutch and configured to rotate the sleeve clutch.

According to embodiments of the present disclosure, the washing and dewatering performance of a washing machine can be improved by efficiently detecting the number of rotations of a driving motor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
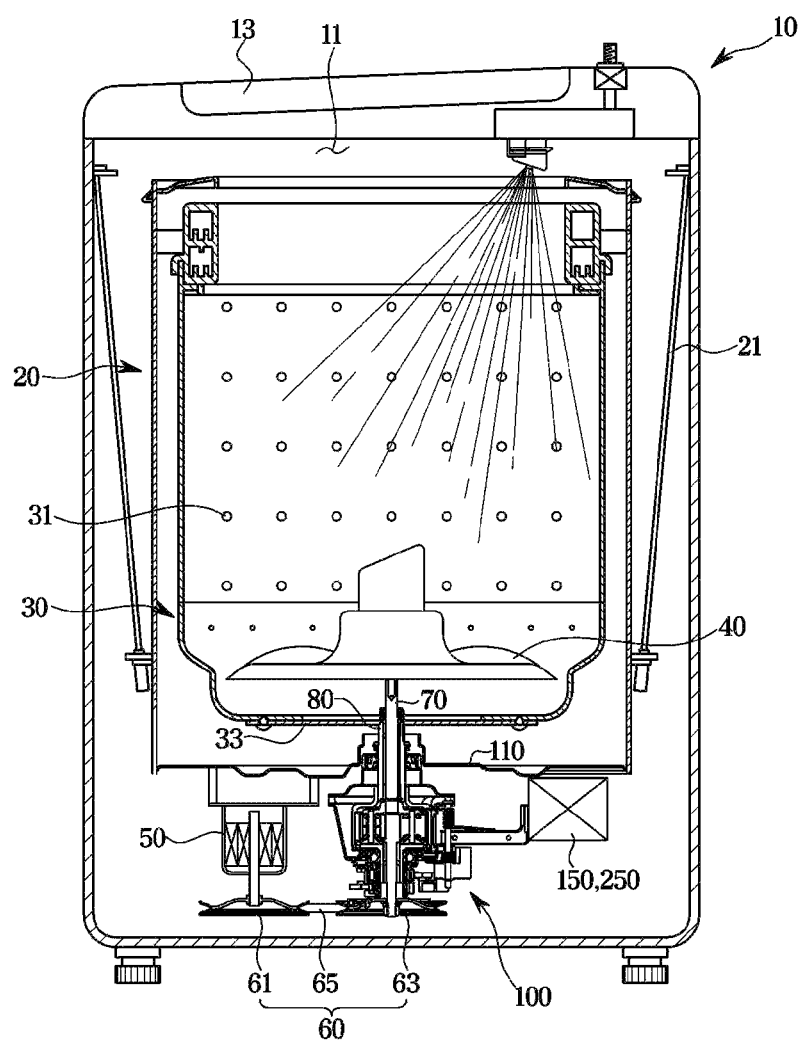
FIG. 1 is a schematic side cross-sectional view illustrating a washing machine according to an embodiment of the present disclosure.

FIGS. 1 through 35, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in this specification and configurations illustrated in the accompanying drawings are only exemplary examples of the disclosed disclosure. The disclosure covers various modifications that can substitute for the embodiments and drawings herein at the time of filing of this application.

In addition, the same reference numerals or symbols refer to parts or components that substantially perform the same function.

In addition, the terms used in the present specification are merely used to describe exemplary embodiments, and are not intended to limit and/or restrict the embodiments. An expression used in the singular encompasses the expression of the plural unless it has a clearly different meaning in context. In the present specification, terms such as "including," "having," and "comprising" are intended to indicate the presence of the features, numbers, steps, actions, components, parts, or combinations thereof disclosed in the specification, and are not intended to preclude the possibility that one or more other features, numbers, steps, actions, components, parts, or combinations thereof may be present or added.

In addition, it should be understood that, although the terms "first," "second," and the like may be used herein to describe various elements, these elements should not be limited by these terms. These terms are only used to distinguish one element from another element. For example, a first element could be termed a second element, and, similarly, a second element could be termed a first element, without departing from the scope of the present disclosure. As used herein, the term "and/or" includes one or combinations of the associated listed items.

Meanwhile, terms used in the specification such as "front end," "rear end," "upper portion," "lower portion," "upper end" and "lower end" are defined based on the drawings, and shapes and positions of components are not limited by the terms.

Hereinafter, embodiments according to the present disclosure will be described in detail with reference to the accompanying drawings.

FIG. 1 is a schematic side cross-sectional view illustrating a washing machine according to an embodiment of the present disclosure.

As illustrated in FIG. 1, the washing machine may include a cabinet 10 forming an exterior, a water tank 20 provided in the cabinet 10 to store washing water, a rotating tub 30 rotatably disposed in the water tank 20 to accommodate laundry, a pulsator 40 provided in the rotating tub 30 to be rotated by a washing shaft 70, a driving motor 50 disposed under the rotating tub 30 to rotate the rotating tub 30 and the pulsator 40, a pulley 60 for connecting the driving motor 50 and the washing shaft 70, and a clutch 100 disposed under the rotating tub 30 to selectively transmit a rotational force generated by the driving motor 50 to the rotating tub 30.

A laundry inlet 11 for inputting laundry to the rotating tub 30 may be formed in an upper portion of the cabinet 10. A door 13 for opening or closing the laundry inlet 11 may be provided in the upper portion of the cabinet 10.

The water tank 20 may be provided to store washing water. The water tank 20 may be disposed in the cabinet 10 to be supported by the cabinet 10 through a suspension 21 that can reduce vibrations generated by the cabinet 10 or the water tank 20 during washing or dewatering.

The rotating tub 30 may be formed in substantially a hollow cylindrical shape and rotatably installed in the water tank 20. A plurality of through holes 31 through which washing water passes from the inside to the outside of the rotating tub 30 may be formed in a side surface of the rotating tub 30. A flange shaft 33 connected to the dewatering shaft 80 to transmit a rotational force of the driving motor 50 to the rotating tub 30 may be coupled to a lower portion of the rotating tub 30.

The pulsator 40 may be rotatably installed on the bottom in the rotating tub 30 and may serve to stir laundry introduced into to the rotating tub 30 with the washing water. The pulsator 40 may be connected to the driving motor 50 by the washing shaft 70. When the rotational force generated by the driving motor 50 is transmitted to the washing shaft 70, and the washing shaft 70 rotates, the pulsator 40 may rotate with the washing shaft 70.

When the flange shaft 33 is connected to the driving motor 50 by the dewatering shaft 80, and the rotational force generated by the driving motor 50 is transmitted to the dewatering shaft 80 to rotate the dewatering shaft 80, the rotating tub 30 may rotate with the dewatering shaft 80.

The pulley 60 may connect the driving motor 50 and the washing shaft 70 so that the washing shaft 70 is rotated by the driving motor 50. The pulley 60 may include a first pulley 61 that is directly connected to and rotated by the driving motor 50, a second pulley 63 that is connected to the washing shaft 70 and rotated, and a belt 65 that connects the first pulley 61 and the second pulley 63. Upon driving the driving motor 50 and rotating the first pulley 61, the second pulley 63 may be rotated by the belt 65, and thus the washing shaft 70 may rotate.

The clutch 100 may be provided under the rotating tub 30 and may selectively transmit the rotational force generated by the driving motor 50 to the rotating tub 30 through the dewatering shaft 80.

Figure 2:
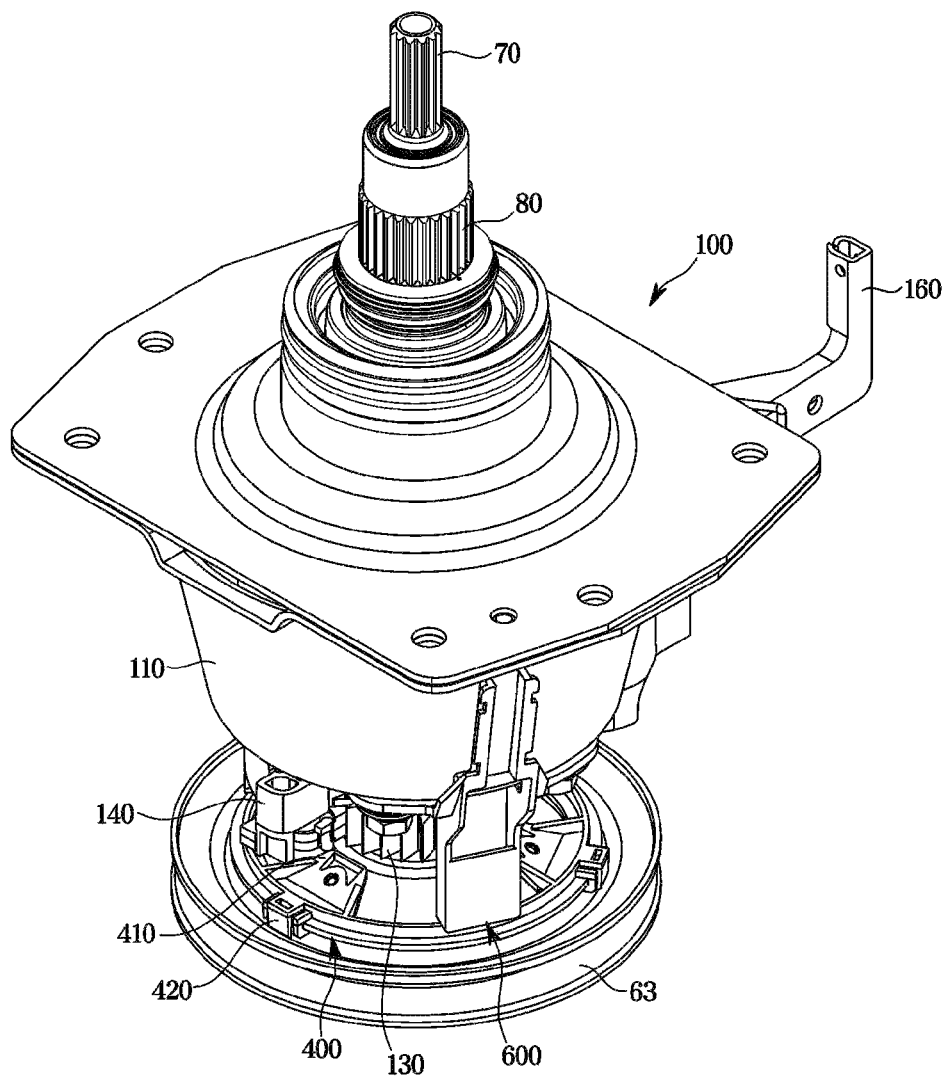
FIG. 2 is a perspective view illustrating a state in which a second pulley is provided under a clutch through which a washing shaft and a dewatering shaft pass according to an embodiment of the present disclosure.
Figure 3:
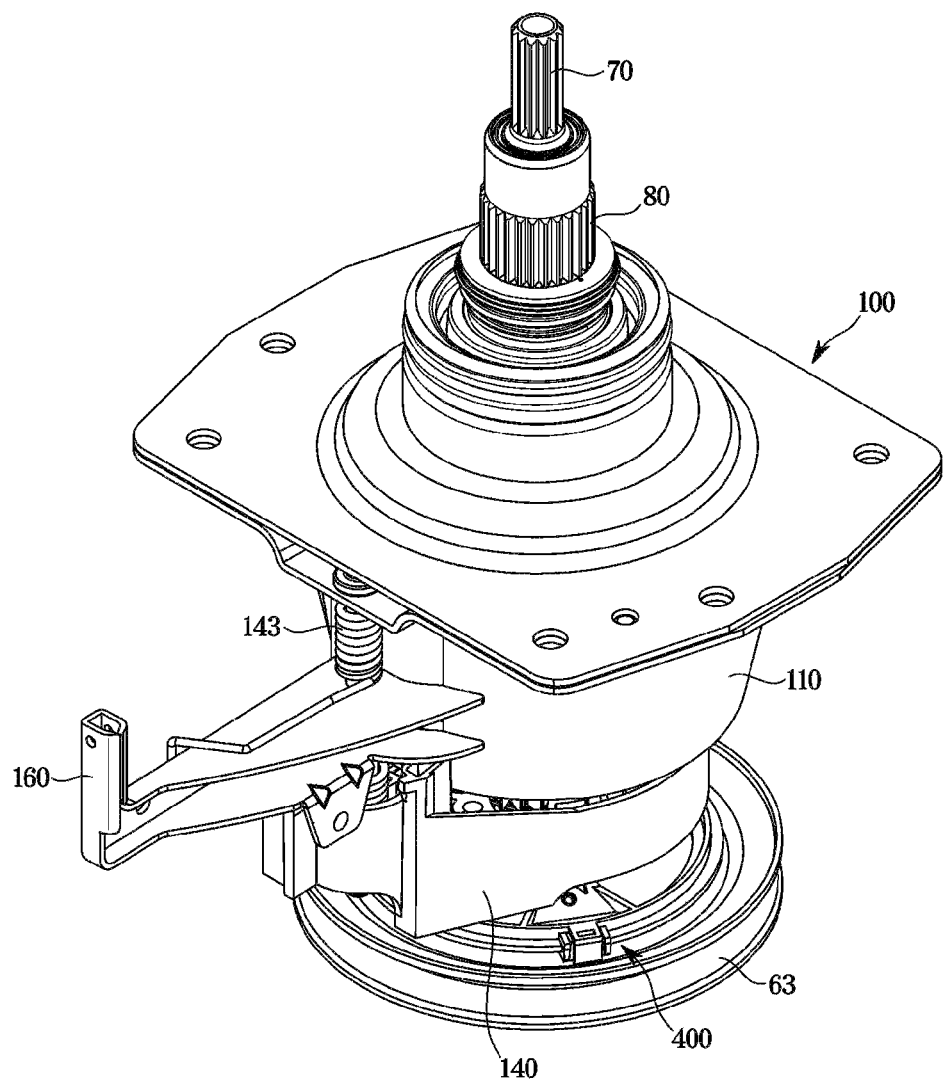
FIG. 3 is a perspective view illustrating the state of FIG. 2 from a different direction.
Figure 4:
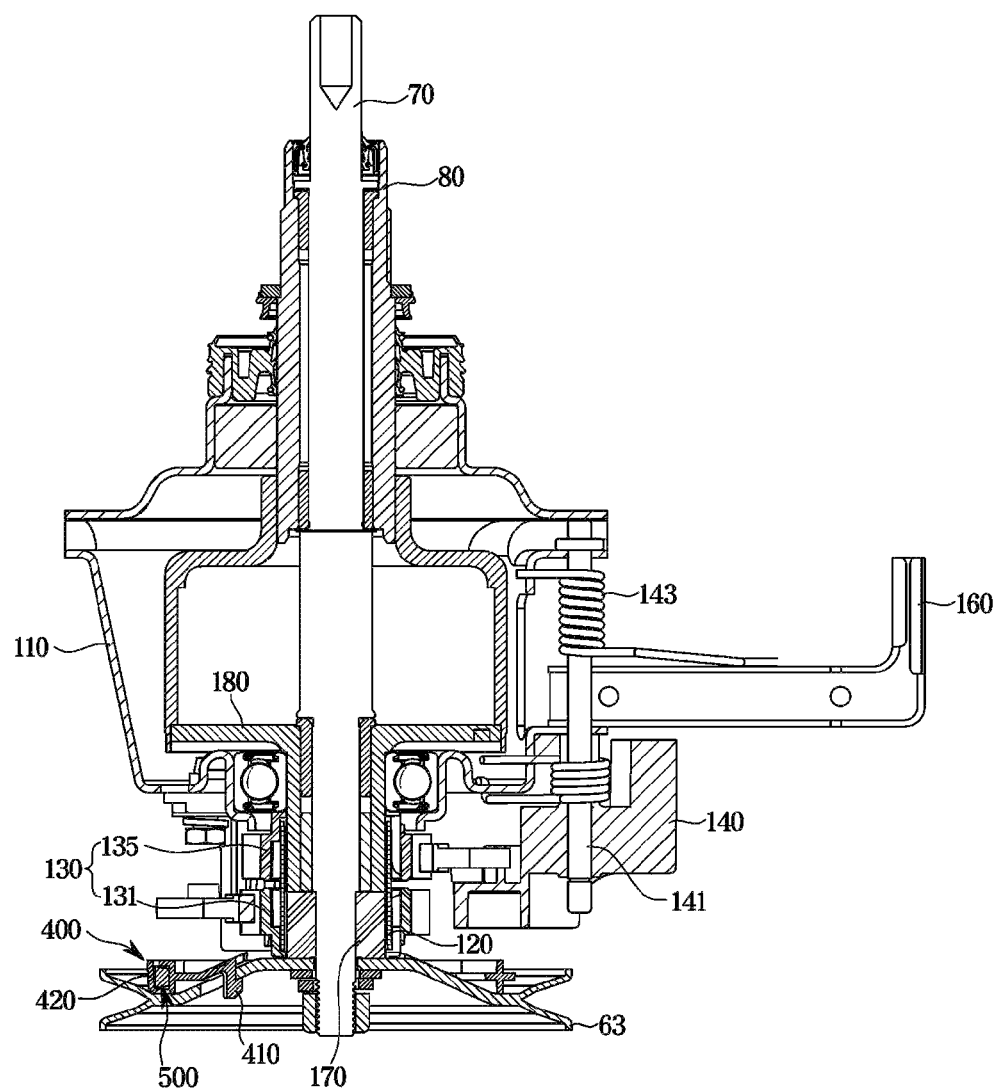
FIG. 4 is a schematic cross-sectional view illustrating the clutch according to an embodiment of the present disclosure.
Figure 5:
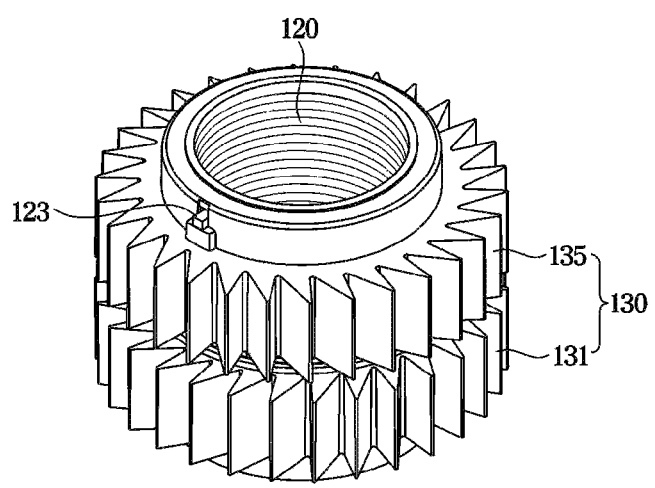
FIG. 5 is a view illustrating a state in which a sleeve clutch surrounds an outer circumferential surface of a spring clutch according to an embodiment of the present disclosure.
Figure 6:
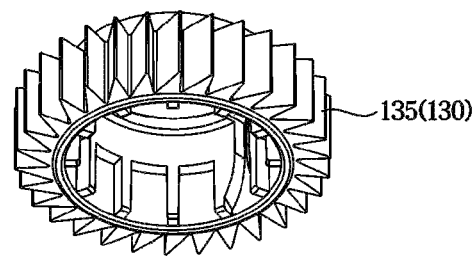
FIG. 6 is a view illustrating a process in which a lower end of the spring clutch is connected to a first sleeve clutch according to an embodiment of the present disclosure.
Figure 6:
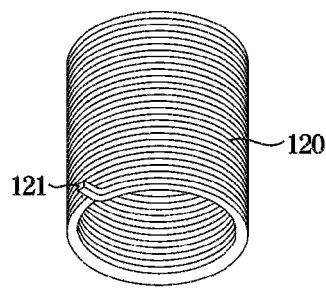
Figure 6:
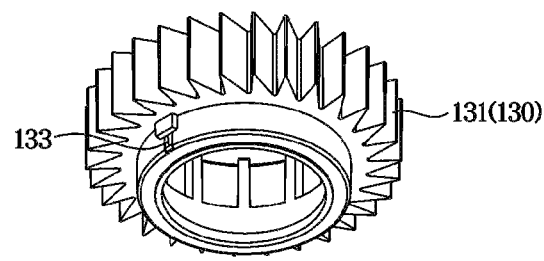
Figure 7:
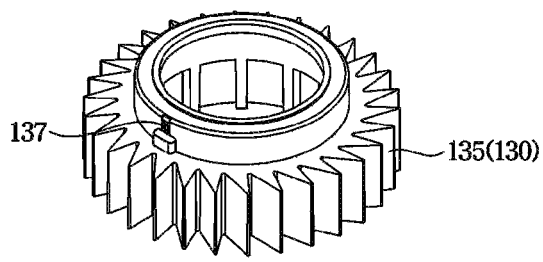
FIG. 7 is a view illustrating a process in which an upper end of the spring clutch is connected to a second sleeve clutch according to an embodiment of the present disclosure.
Figure 7:
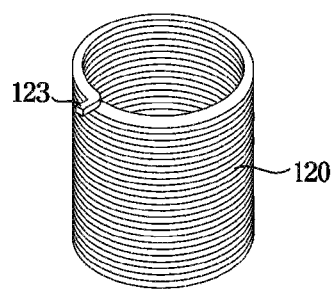
Figure 7:
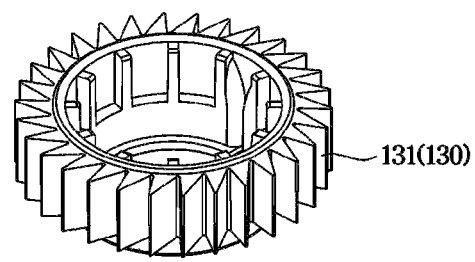
Figure 8:
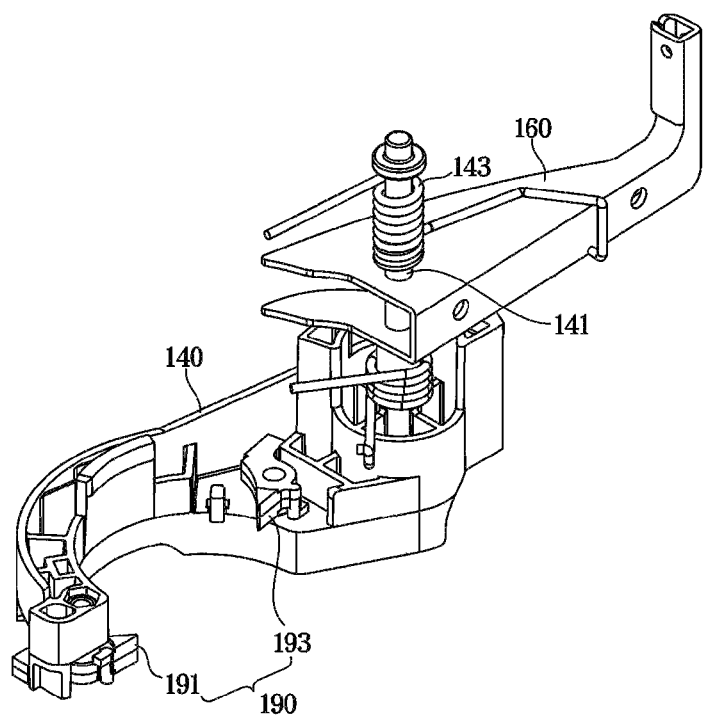
FIG. 8 is a view illustrating a lever clutch and a brake lever according to an embodiment of the present disclosure.
Figure 9:
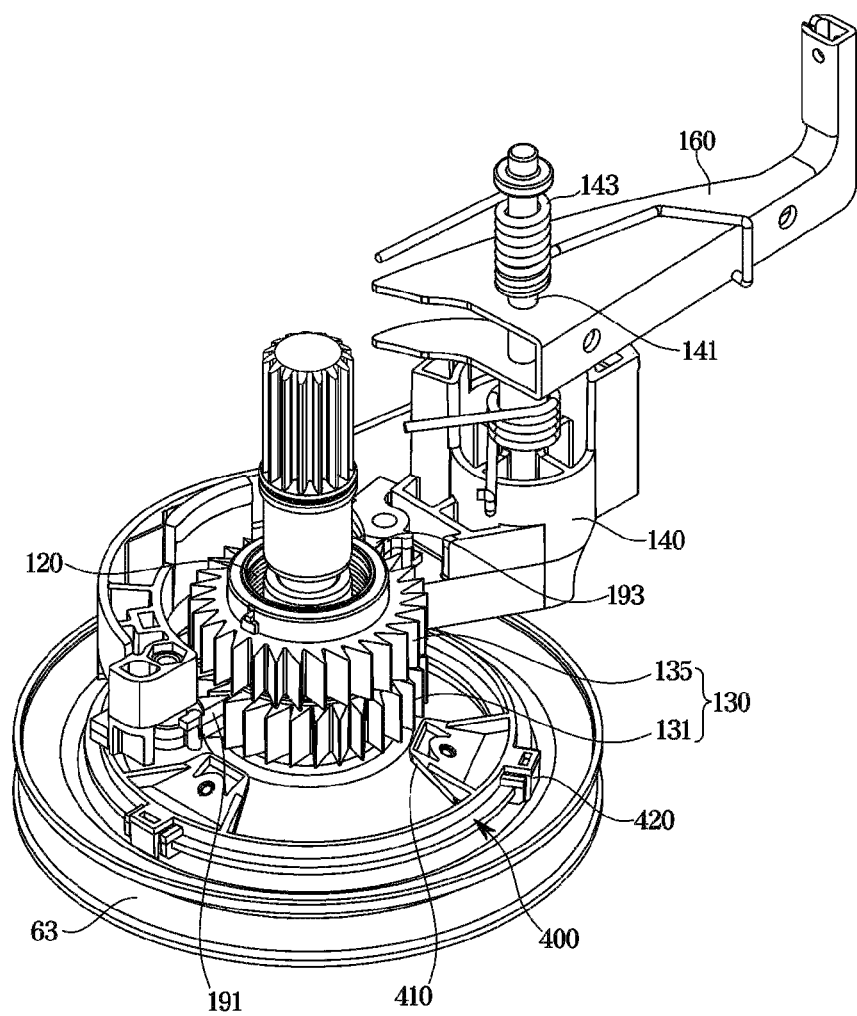
FIG. 9 is a view illustrating a state in which the lever clutch is in contact with the sleeve clutch according to an embodiment of the present disclosure.

FIG. 2 is a perspective view illustrating a state in which the second pulley is provided under the clutch through which the washing shaft and the dewatering shaft pass according to an embodiment of the present disclosure. FIG. 3 is a perspective view illustrating the state of FIG. 2 from a different direction. FIG. 4 is a schematic cross-sectional view illustrating the clutch according to an embodiment of the present disclosure. FIG. 5 is a view illustrating a state in which a sleeve clutch surrounds an outer circumferential surface of a spring clutch according to an embodiment of the present disclosure. FIG. 6 is a view illustrating a process in which a lower end of the spring clutch is connected to a first sleeve clutch according to an embodiment of the present disclosure. FIG. 7 is a view illustrating a process in which an upper end of the spring clutch is connected to a second sleeve clutch according to an embodiment of the present disclosure. FIG. 8 is a view illustrating a lever clutch and a brake lever according to an embodiment of the present disclosure. FIG. 9 is a view illustrating a state in which the lever clutch is in contact with the sleeve clutch according to an embodiment of the present disclosure.

As illustrated in FIGS. 2 to 9, the clutch 100 may include a housing 110 through which the washing shaft 70 and the dewatering shaft 80 rotatably pass, a spring clutch 120 of which an inner diameter decreases or increases to selectively transmit a rotational force to the dewatering shaft 80, a sleeve clutch 130 that is provided to surround an outer circumferential surface of the spring clutch 120, rotates in two directions, and decreases or increases the inner diameter of the spring clutch 120, a lever clutch 140 that rotates the sleeve clutch 130 in two directions, and a brake lever 160 that is driven by a drain motor 150 and rotates the lever clutch 140 (see FIG. 1).

The housing 110 may be provided under the water tank 20. The housing 110 may be fixed to a lower portion of the water tank 20. The washing shaft 70 and the dewatering shaft 80 may be provided to rotatably pass through a central portion of the housing 110.

The spring clutch 120 may be accommodated in the sleeve clutch 130. Two ends of an upper portion and a lower portion of the spring clutch 120 may be connected to the sleeve clutch 130. Two ends of the spring clutch 120 may be connected to the sleeve clutch 130, and the inner diameter of the spring clutch 120 may decrease or increase according to a rotation direction of the sleeve clutch 130 that rotates in two directions. Specifically, a first end 121 that is a lower end of the spring clutch 120 may be connected to a first sleeve clutch 131. The first sleeve clutch 131 may include a first connector 133 to which the first end 121 of the spring clutch 120 is connected. A second end 123 of the spring clutch 120, which is an upper end of the spring clutch 120, may be connected to a second sleeve clutch 135. The second sleeve clutch 135 may include a second connector 137 to which the second end 123 of the spring clutch 120 is connected. Accordingly, the inner diameter of the spring clutch 120 may decrease or increase according to a rotation direction of the first sleeve clutch 131 and the second sleeve clutch 135.

A part of a clutch boss 170 and a part of a case gear 180 may be accommodated in the spring clutch 120. The clutch boss 170 may be accommodated in the lower portion of the spring clutch 120. The clutch boss 170 may be connected to the washing shaft 70. Accordingly, upon driving the driving motor 50 to rotate the washing shaft 70, the clutch boss 170 may rotate with the washing shaft 70.

A part of a lower portion of the case gear 180 may be accommodated at the inner upper end of the spring clutch 120. That is, the lower portion of the case gear 180 may be positioned on the clutch boss 170 in the spring clutch 120. The case gear 180 may be connected to the dewatering shaft 80.

In response to an increase in the inner diameter of the spring clutch 120 due to the rotation of the sleeve clutch 130, the spring clutch 120 may be separated and disconnected from the clutch boss 170 and the case gear 180 that are accommodated in the spring clutch 120. When the spring clutch 120 is separated from the clutch boss 170 and the case gear 180, the clutch boss 170 and the case gear 180 may be separated from each other. Accordingly, upon rotating the washing shaft 70 using the driving motor 50, the clutch boss 170 rotates, but the rotation of the case gear 180 may be prevented. In this case, since only the washing shaft 70 rotates, and the rotation of the dewatering shaft 80 connected to the case gear 180 is prevented, the washing machine may operate in a washing mode in which only the pulsator 40 is rotated by the washing shaft 70 (see FIG. 1).

In response to a decrease in the inner diameter of the spring clutch 120 due to the rotation of the sleeve clutch 130, the spring clutch 120 may be in contact with the clutch boss 170 and the case gear 180 that are accommodated in the spring clutch 120. When the spring clutch 120 is in contact with the clutch boss 170 and the case gear 180, the clutch boss 170 and the case gear 180 may be connected by the spring clutch 120. Accordingly, upon rotating the washing shaft 70 using the driving motor 50, the case gear 180 may be rotated by the clutch boss 170 that rotates with the washing shaft 70. Upon rotating the case gear 180, the dewatering shaft 80 connected to the case gear 180 may rotate. In this case, since the dewatering shaft 80 rotates with the washing shaft 70, the washing machine may operate in a dewatering mode in which the pulsator 40 and the rotating tub 30 rotate at the same time.

The sleeve clutch 130 may include the first sleeve clutch 131 provided to surround a lower end portion of the outer circumferential surface of the spring clutch 120 and the second sleeve clutch 135 provided to surround an upper end portion of the outer circumferential surface of the spring clutch 120. The first sleeve clutch 131 may include the first connector 133 to which the first end 121 that is the lower end of the spring clutch 120 is connected. The second sleeve clutch 135 may include the second connector 137 to which the second end 123 that is the upper end of the spring clutch 120 is connected. The sleeve clutch 130 includes the first sleeve clutch 131 surrounding the lower end portion of the outer circumferential surface of the spring clutch 120 and the second sleeve clutch 135 surrounding the upper end portion of the outer circumferential surface of the spring clutch 120 to connect or disconnect the lower end portion of the spring clutch 120 to or from the clutch boss 170 and to connect or disconnect the upper end portion of the spring clutch 120 to or from the case gear 180. Accordingly, even in the case of a large capacity of the washing machine, an overload can be prevented.

The lever clutch 140 may be rotatably coupled to the housing 110. The lever clutch 140 may be connected to the brake lever 160. The lever clutch 140 may include a rotary shaft 141 rotatably coupled to the housing 110 and a lever spring 143 provided around the rotary shaft 141. The brake lever 160 may be connected to the rotary shaft 141. The lever clutch 140 may be rotated by the brake lever 160 and may rotate the sleeve clutch 130.

An arm clutch 190 for rotating the sleeve clutch 130 while in or out of contact with the sleeve clutch 130 may be coupled to the lever clutch 140. The arm clutch 190 may include a first arm clutch 191 that is in or out of contact with the first sleeve clutch 131 and a second arm clutch 193 that is in or out of contact with the second sleeve clutch 135.

The brake lever 160 may be operated by the drain motor 150. Upon driving the drain motor 150, the lever clutch 140 may be rotated about the rotary shaft 141 in one direction by the brake lever 160. Upon stopping the drain motor 150, the lever clutch 140 may be rotated about the rotary shaft 141 in the other direction by the lever spring 143.

Figure 10:
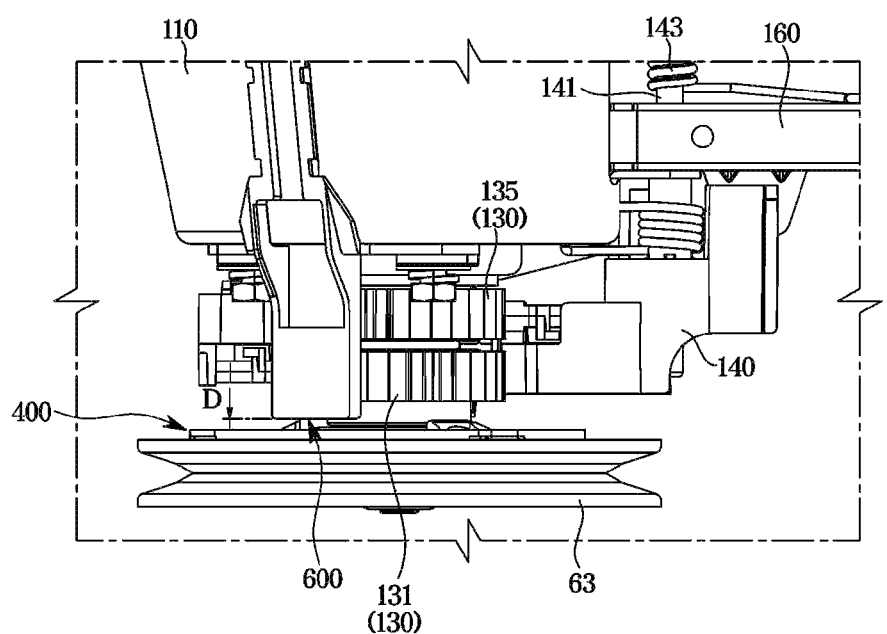
FIG. 10 is a view illustrating a state in which a bracket to which a magnet is fixed is coupled to an upper portion of the second pulley, and a sensor unit is coupled to a housing according to an embodiment of the present disclosure.
Figure 11:
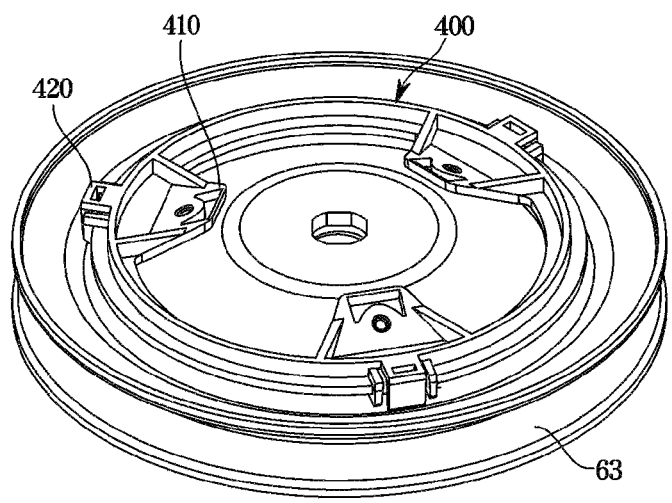
FIG. 11 is a view illustrating a state in which the bracket is coupled to the upper portion of the second pulley according to an embodiment of the present disclosure.
Figure 12:
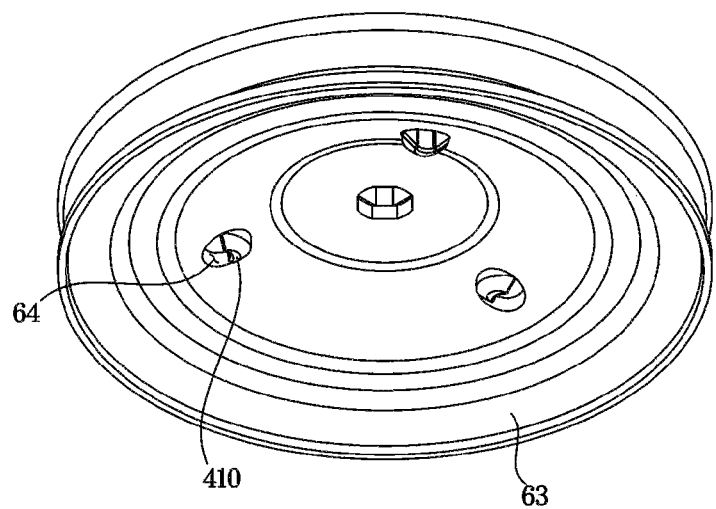
FIG. 12 is a view illustrating a state in which the bracket is hook-coupled to the second pulley according to an embodiment of the present disclosure.
Figure 13:
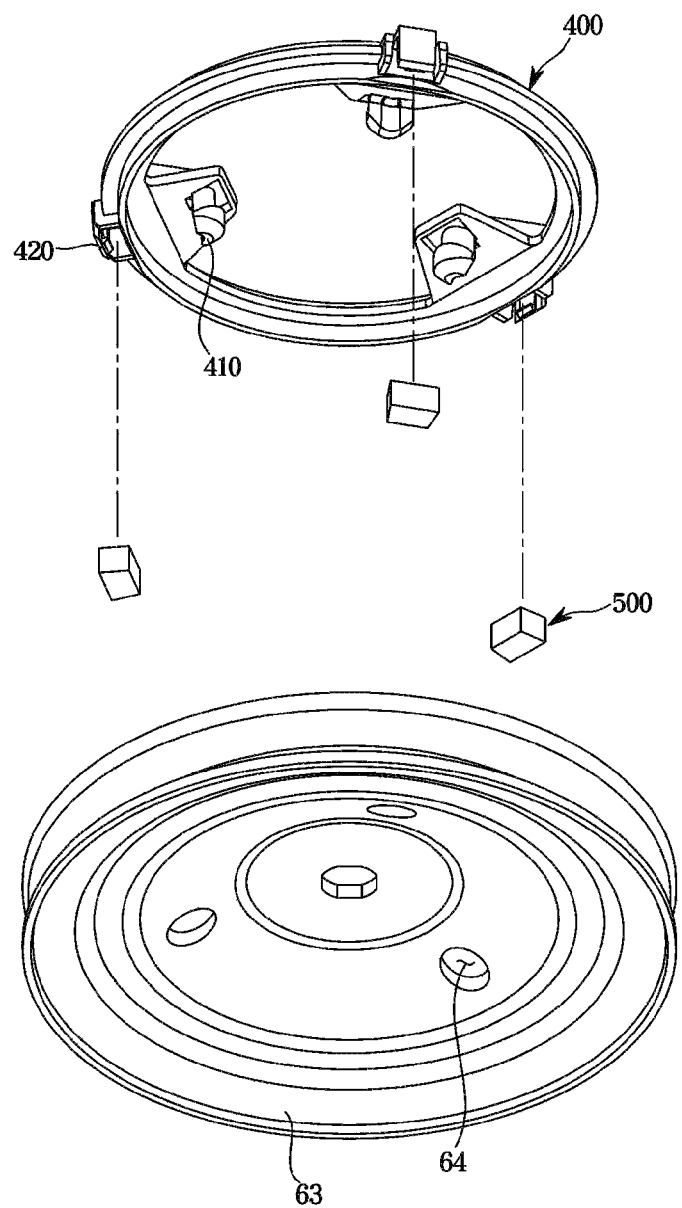
FIG. 13 is a view illustrating a state in which the bracket is separated from the second pulley according to an embodiment of the present disclosure.

FIG. 10 is a view illustrating a state in which a bracket to which a magnet is fixed is coupled to an upper portion of the second pulley, and a sensor unit is coupled to the housing according to an embodiment of the present disclosure. FIG. 11 is a view illustrating a state in which the bracket is coupled to the upper portion of the second pulley according to an embodiment of the present disclosure. FIG. 12 is a view illustrating a state in which the bracket is hook-coupled to the second pulley according to an embodiment of the present disclosure. FIG. 13 is a view illustrating a state in which the bracket is separated from the second pulley according to an embodiment of the present disclosure.

As illustrated in FIGS. 10 to 13, a bracket 400 may be detachably coupled to the upper portion of the second pulley 63. The bracket 400 may be provided to have a ring shape. The bracket 400 may include a plurality of hooks 410 detachably coupled to the second pulley 63 and a plurality of magnet mounts 420 that are formed along an edge of the bracket 400 and to which a magnet 500 is fixed.

The magnet 500 may be provided as a plurality of magnets 500. Most preferably, three magnets 500 may be provided. In the case of three magnets 500, a measurement time may be reduced with respect to 25 revolutions per minute (rpm), which is the minimum rpm at which the number of rotations of the driving motor 50 is detected. The magnet 500 may be provided in a trapezoidal shape having a short side and a long side. Upon fixing the magnet 500 to the magnet mount 420, the short side may be oriented toward a center of the bracket 400. Accordingly, a recognition error due to wrong assembly of the magnet 500 can be prevented. That is, the magnets 500 have N-poles and S-poles, and when the N-poles are positioned at the short sides and the S-poles are positioned at the long sides, all the N-poles of all the magnets 500 may match to face the center of the bracket 400. The magnet mount 420 may be provided in a hook shape to which the magnet 500 is detachably coupled.

A plurality of coupling holes 64 to which the plurality of hooks 410 formed on the bracket 400 are detachably coupled may be formed in the second pulley 63. The plurality of hooks 410 may pass through the plurality of coupling holes 64 in the upper portion of the second pulley 63 so that the bracket 400 may be coupled to the upper portion of the second pulley 63. The plurality of hooks 410 may pass through the plurality of coupling holes 64 to be coupled to the plurality of coupling holes 64, and thus the bracket 400 can be prevented from being separated upward (see FIG. 16).

Figure 14:
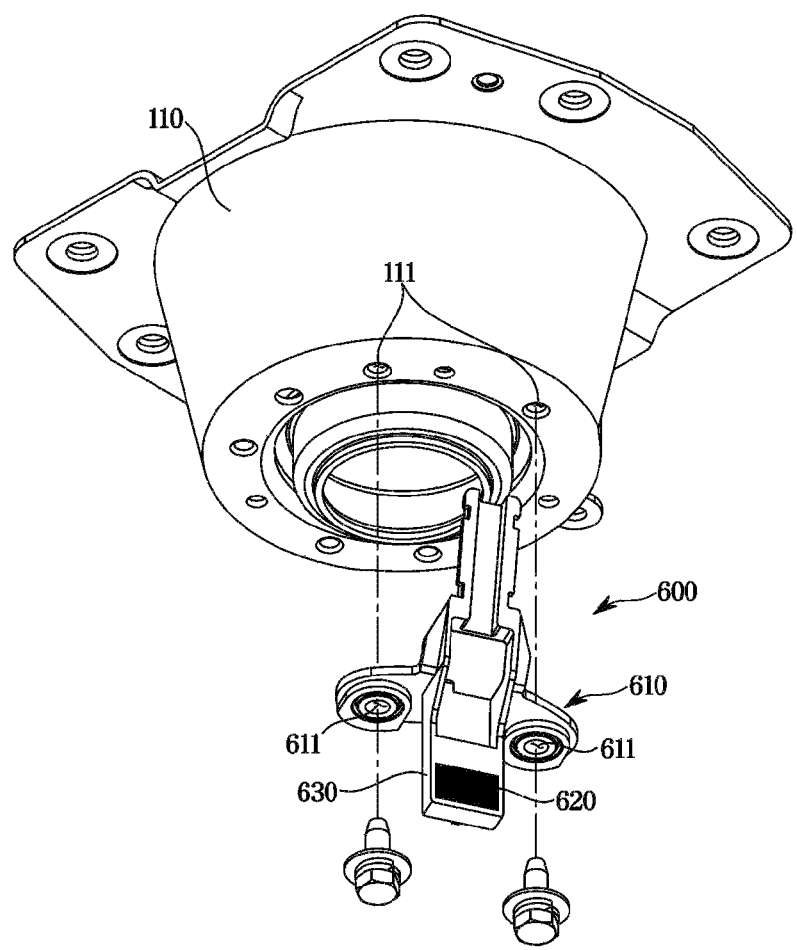
FIG. 14 is a view illustrating a process in which the sensor unit is coupled to a housing of the clutch according to an embodiment of the present disclosure.

FIG. 14 is a view illustrating a process in which the sensor unit is coupled to the housing of the clutch according to an embodiment of the present disclosure.

As illustrated in FIG. 14, a sensor unit 600 may include a coupler 610 including a plurality of coupling holes 611 coupled to the housing and a sensor mount 630 that extends from the coupler 610 toward the second pulley 63 and to which a sensor 620 for detecting the magnet 500 is fixed. The sensor 620 may be fixed to an end of the sensor mount 630 to be positioned on the bracket 400. Most preferably, a distance D between the sensor 620 and the magnet 500 may be in the range of 2 to 4 mm. The housing 110 may include a sensor unit coupling hole 111 to which the sensor unit 600 is coupled. The sensor unit 600 may be coupled to the housing 110 by a coupling member such as a bolt (see FIG. 10 and FIG. 16).

Figure 15:
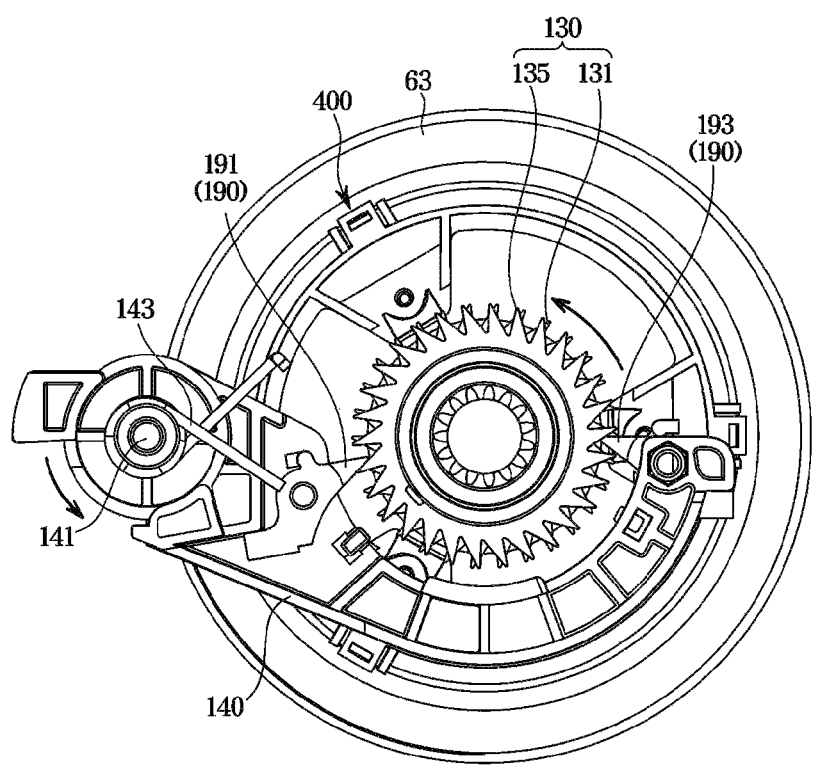
FIG. 15 is a view illustrating a state in which the sleeve clutch is rotated counter-clockwise by the lever clutch in a washing mode of the washing machine according to an embodiment of the present disclosure.
Figure 16:
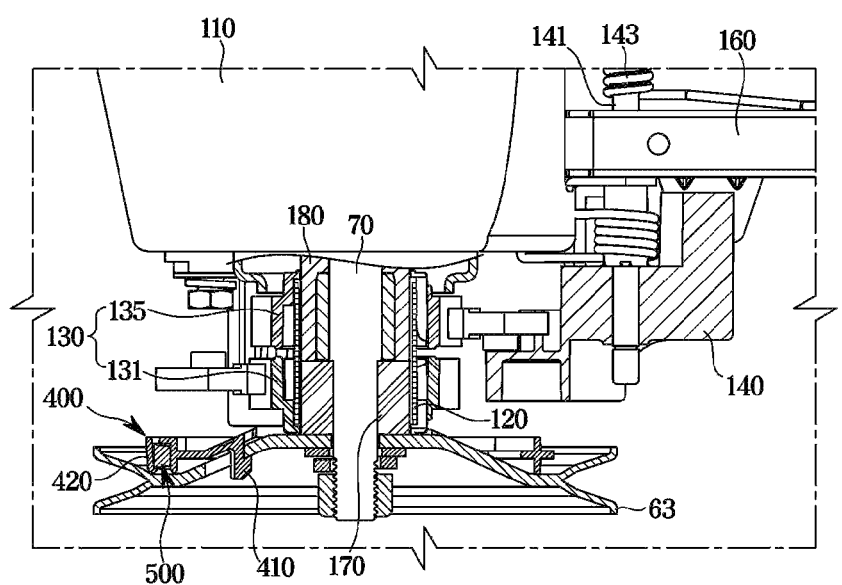
FIG. 16 is a view illustrating a state in which an inner diameter of the spring clutch increases to separate the spring clutch from a clutch boss and a case gear in the state of FIG. 15.
Figure 17:
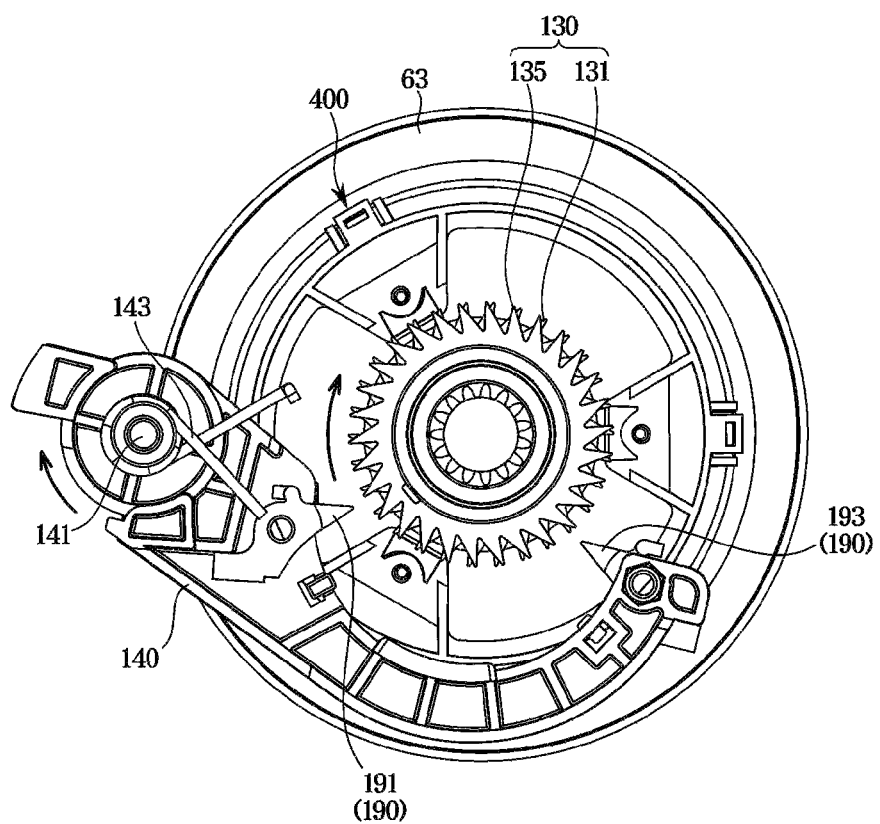
FIG. 17 is a view illustrating a state in which the sleeve clutch is rotated clockwise by the lever clutch in a dewatering mode of the washing machine according to an embodiment of the present disclosure.
Figure 18:
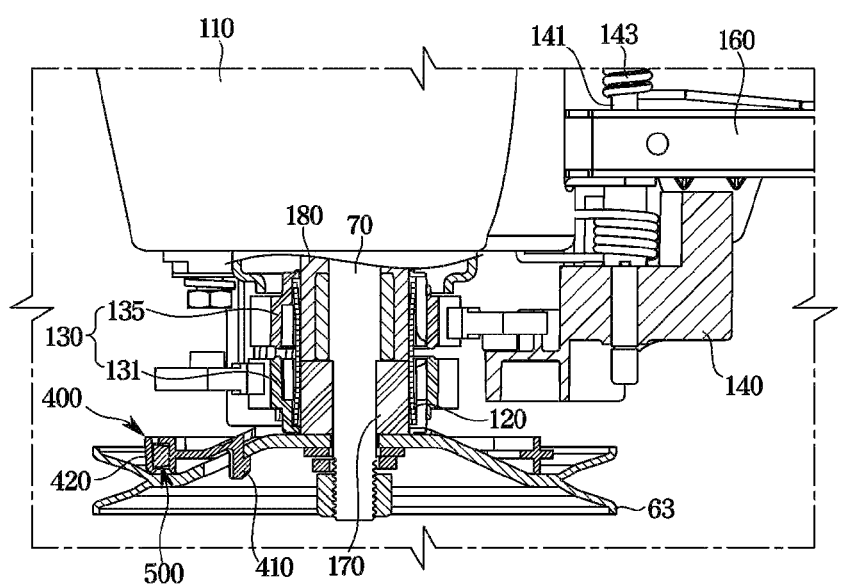
FIG. 18 is a view illustrating a state in which the inner diameter of the spring clutch decreases to connect the spring clutch to the clutch boss and the case gear in the state of FIG. 17.

FIG. 15 is a view illustrating a state in which the sleeve clutch is rotated counter-clockwise by the lever clutch in the washing mode of the washing machine according to an embodiment of the present disclosure. FIG. 16 is a view illustrating a state in which the inner diameter of the spring clutch increases to separate the spring clutch from the clutch boss and the case gear in the state of FIG. 15. FIG. 17 is a view illustrating a state in which the sleeve clutch is rotated clockwise by the lever clutch in the dewatering mode of the washing machine according to an embodiment of the present disclosure. FIG. 18 is a view illustrating a state in which the inner diameter of the spring clutch decreases to connect the spring clutch to the clutch boss and the case gear in the state of FIG. 17.

As illustrated in FIGS. 15 and 16, in the washing mode of the washing machine, the washing machine may be in a state in which the arm clutch 190 coupled to the lever clutch 140 is in contact with the sleeve clutch 130 to rotate the first sleeve clutch 131 and the second sleeve clutch 135 counter-clockwise in a state in which the drain motor 150 (see FIG. 1) is stopped. Upon rotating the first sleeve clutch 131 and the second sleeve clutch 135 counter-clockwise, the inner diameter of the spring clutch 120 may increase. In response to an increase in the inner diameter of the spring clutch 120, the spring clutch 120 may be separated from the clutch boss 170 and the case gear 180. Upon separating the spring clutch 120 from the clutch boss 170 and the case gear 180, the clutch boss 170 and the case gear 180 may be separated from each other. Upon separating the clutch boss 170 from the case gear 180 and rotating the second pulley 63 using the driving motor 50 to rotate the washing shaft 70, the clutch boss 170 rotates with the washing shaft 70, but the rotation of the case gear 180 may be prevented. When the rotation of the case gear 180 is prevented, since the dewatering shaft 80 does not rotate, only the pulsator 40 connected to the washing shaft 70 may rotate, and thus the washing mode may be performed.

As illustrated in FIGS. 17 and 18, in the dewatering mode of the washing machine, the drain motor 150 (see FIG. 1) may be driven to rotate the lever clutch 140 about the rotary shaft 141 by the brake lever 160. Upon rotating the lever clutch 140 clockwise about the rotary shaft 141, the arm clutch 190 coupled to the lever clutch 140 may be separated from the first sleeve clutch 131 and the second sleeve clutch 135 and may rotate the first sleeve clutch 131 and the second sleeve clutch 135 clockwise. Upon rotating the first sleeve clutch 131 and the second sleeve clutch 135 clockwise, the inner diameter of the spring clutch 120 may decrease. In response to a decrease in the inner diameter of the spring clutch 120, the clutch boss 170 and the case gear 180 may be connected by the spring clutch 120. Upon connecting the clutch boss 170 and the case gear 180 and rotating the second pulley 63 using the driving motor 50 to rotate the washing shaft 70, the case gear 180 may be rotated by the clutch boss 170 that rotates with the washing shaft 70. Upon rotating the case gear 180, the dewatering shaft 80 connected to the case gear 180 rotates so that the washing shaft 70 and the dewatering shaft 80 may rotate at the same time. Upon rotating the washing shaft 70 and the dewatering shaft 80 at the same time, the pulsator 40 connected to the washing shaft 70 and the rotating tub 30 connected to the dewatering shaft 80 may rotate at the same time so that the dewatering mode may be performed.

When the dewatering mode is completely performed and switched to the washing mode, the drain motor 150 (see FIG. 1) may be stopped. Upon stopping the drain motor 150, as illustrated in FIG. 15, the lever clutch 140 may be rotated counter-clockwise about the rotary shaft 141 by the lever spring 143. Upon rotating the lever clutch 140 counter-clockwise about the rotary shaft 141, the arm clutch 190 coupled to the lever clutch 140 may be in contact with the sleeve clutch 130 and may rotate the sleeve clutch 130 counter-clockwise. Upon rotating the sleeve clutch 130 counter-clockwise, as illustrated in FIG. 16, the inner diameter of the spring clutch 120 may increase so that the spring clutch 120 may be separated from the clutch boss 170 and the case gear 180. When the clutch boss 170 and the case gear 180 are separated from each other, and the second pulley 63 is rotated by the driving motor 50 to rotate the washing shaft 70, the clutch boss 170 rotates with the washing shaft 70, but the rotation of the case gear 180 can be prevented. When the rotation of the case gear 180 is prevented, since the dewatering shaft 80 does not rotate, only the pulsator 40 connected to the washing shaft 70 may rotate so that the washing mode may be performed.

Figure 19:
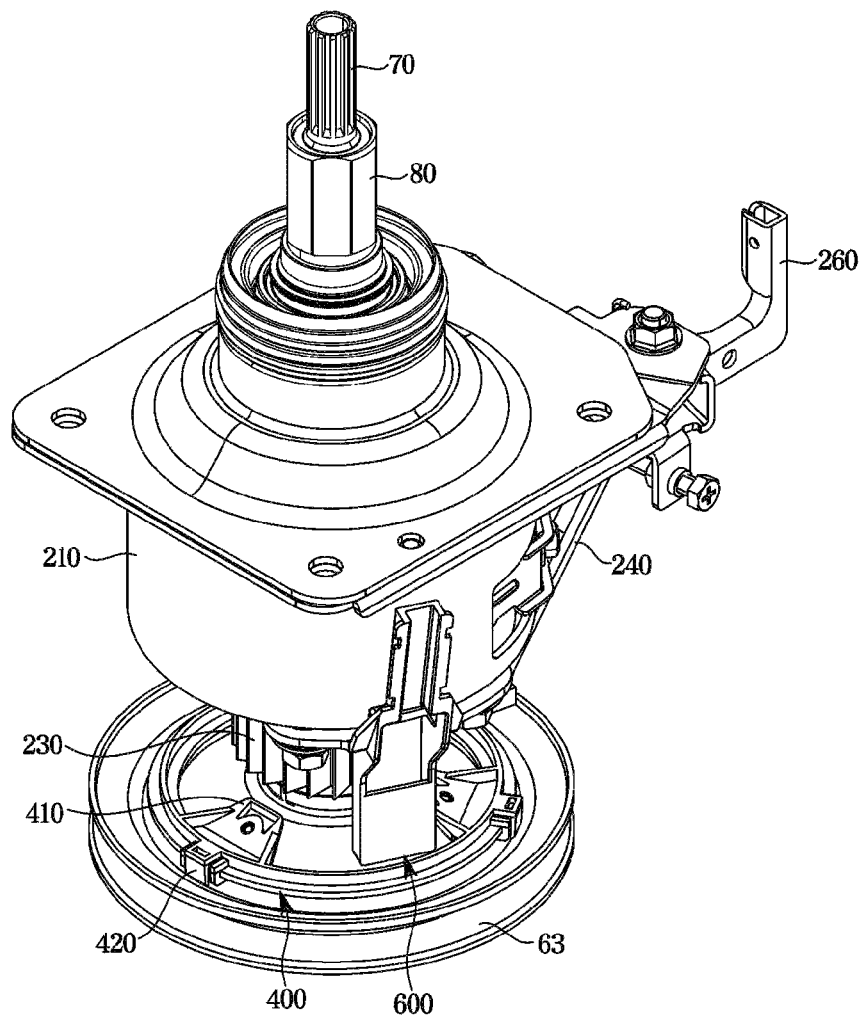
FIG. 19 is a perspective view illustrating a state in which a second pulley is provided under a clutch through which a washing shaft and a dewatering shaft pass according to another embodiment of the present disclosure.
Figure 20:
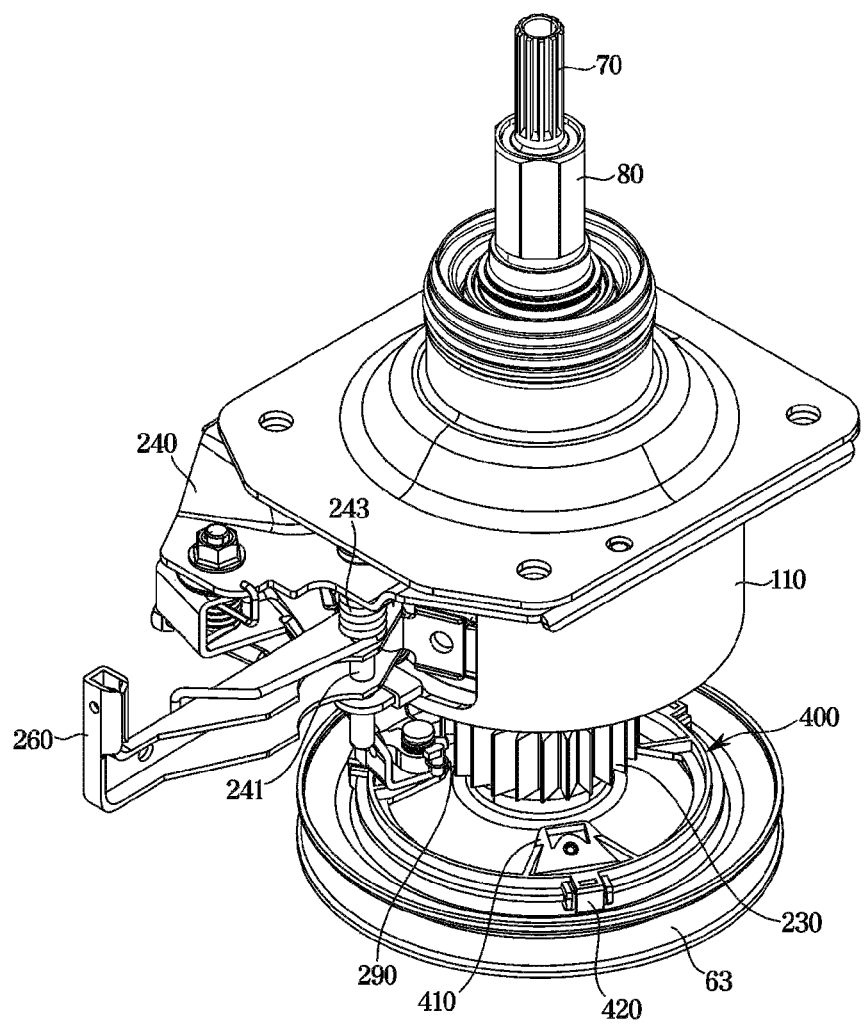
FIG. 20 is a perspective view illustrating the state of FIG. 19 from a different direction.
Figure 21:
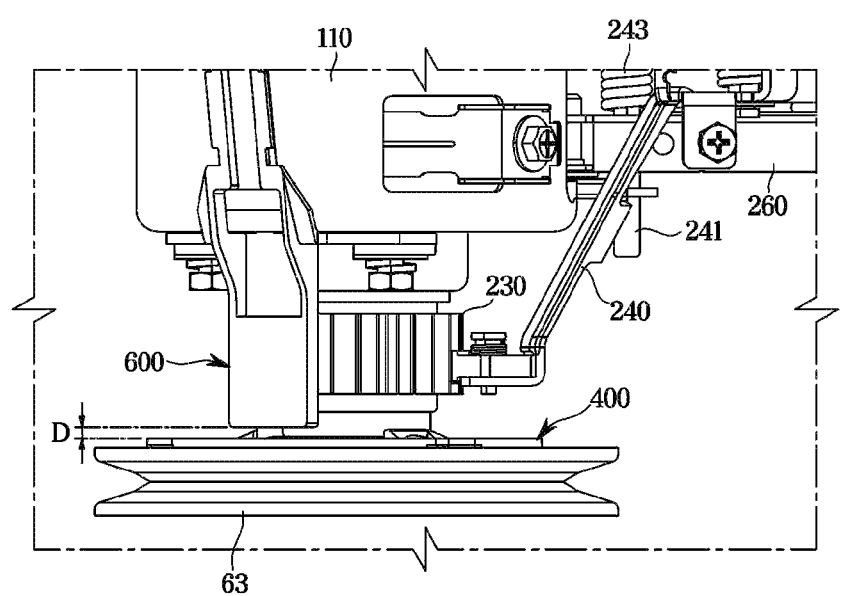
FIG. 21 is a view illustrating a state in which a bracket to which a magnet is fixed is coupled to an upper portion of the second pulley, and a sensor unit is coupled to a housing according to another embodiment of the present disclosure.

FIG. 19 is a perspective view illustrating a state in which a second pulley is provided under a clutch through which a washing shaft and a dewatering shaft pass according to another embodiment of the present disclosure. FIG. 20 is a perspective view illustrating the state of FIG. 19 from a different direction. FIG. 21 is a view illustrating a state in which a bracket to which a magnet is fixed is coupled to an upper portion of the second pulley, and a sensor unit is coupled to a housing according to another embodiment of the present disclosure.

Figure 23:
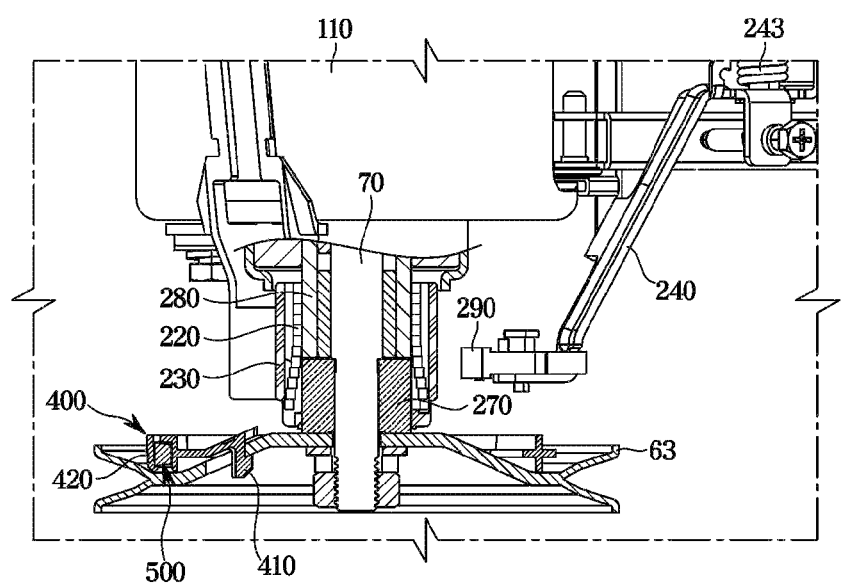
FIG. 23 is a view illustrating a state in which an inner diameter of a spring clutch increases to separate the spring clutch from a clutch boss in the state of FIG. 22.

As illustrated in FIGS. 19 to 21, a clutch 200 may include a housing 210 through which a washing shaft 70 and a dewatering shaft 80 rotatably pass, a spring clutch 220 of which an inner diameter decreases to selectively transmit a rotational force to the dewatering shaft 80, a sleeve clutch 230 that is provided to surround an outer circumferential surface of the spring clutch 220, rotates in two directions, and decreases or increases the inner diameter of the spring clutch 220, a lever clutch 240 for rotating the sleeve clutch 230 in two directions, and a brake lever 260 operated by a drain motor 250 to rotate the lever clutch 240 (see FIG. 23).

The clutch 200 may be the same as the clutch 100 illustrated in FIGS. 2 to 9 except that one sleeve clutch 230 is provided. That is, since one sleeve clutch 230 is provided, only one arm clutch 290 in contact with the sleeve clutch 230 is provided, and thus an entire configuration of the clutch 200 may be the same as that of the clutch 100 illustrated in FIGS. 2 to 9 except that a shape of the lever clutch 240 to which the arm clutch 290 is coupled is partially different. Description of the same configuration will be omitted. In addition, since a configuration in which a bracket 400 is coupled to a second pulley 63 and a configuration in which a sensor unit 600 is coupled to the housing 210 are also the same as those of the clutch 100 illustrated in FIGS. 2 to 9, description thereof will be omitted.

The spring clutch 220 may be accommodated in the sleeve clutch 230. A lower end of the spring clutch 220 may be connected to the sleeve clutch 230. The lower end of the spring clutch 220 may be connected to the sleeve clutch 230, and thus an inner diameter of a lower portion of the spring clutch 220 may decrease or increase according to a rotation direction of the sleeve clutch 230 that rotates in two directions. An upper portion of the spring clutch 220 may always remain in contact with a case gear 280 regardless of rotation of the sleeve clutch 230. Accordingly, only the lower portion of the spring clutch 220 may come in and out of contact with a clutch boss 270 according to the rotation direction of the sleeve clutch 230.

In response to an increase in the inner diameter of the lower portion of the spring clutch 220 due to the rotation of the sleeve clutch 230, the spring clutch 220 may be separated and disconnected from the clutch boss 270 accommodated in the spring clutch 220. Upon separating the spring clutch 220 from the clutch boss 270, the clutch boss 270 may be separated from the case gear 180. Accordingly, upon rotating the washing shaft 70 using a driving motor 50, the clutch boss 270 rotates, but the rotation of the case gear 280 can be prevented. In this case, since only the washing shaft 70 rotates, and the rotation of the dewatering shaft 80 connected to the case gear 280 is prevented, the washing machine may operate in a washing mode in which only a pulsator 40 is rotated by the washing shaft 70 (see FIG. 1).

In response to a decrease in the inner diameter of the lower portion of the spring clutch 220 due to the rotation of the sleeve clutch 230, the spring clutch 220 may be in contact with the clutch boss 270 accommodated in the spring clutch 220. When the spring clutch 220 is in contact with the clutch boss 270, the clutch boss 270 and the case gear 280 may be connected by the spring clutch 220. Accordingly, upon rotating the washing shaft 70 using the driving motor 50, the case gear 280 may be rotated by the clutch boss 270 that rotates with the washing shaft 70. Upon rotating the case gear 280, the dewatering shaft 80 connected to the case gear 280 may rotate. In this case, since the dewatering shaft 80 rotates with the washing shaft 70, the washing machine may operate in a dewatering mode in which the pulsator 40 and a rotating tub 30 rotate at the same time.

Since one sleeve clutch 230 is provided, the cost may be low compared to a case in which two sleeve clutches 230 are provided. Since the upper portion of the spring clutch 220 remains in contact with the case gear 280 in a state in which the inner diameter decreases, and since the inner diameter of only the lower portion of the spring clutch 220 decreases or increases so that the lower portion comes in and out of contact with the clutch boss 270, the present embodiment can be applied to a small capacity washing machine instead of a large capacity washing machine.

Figure 22:
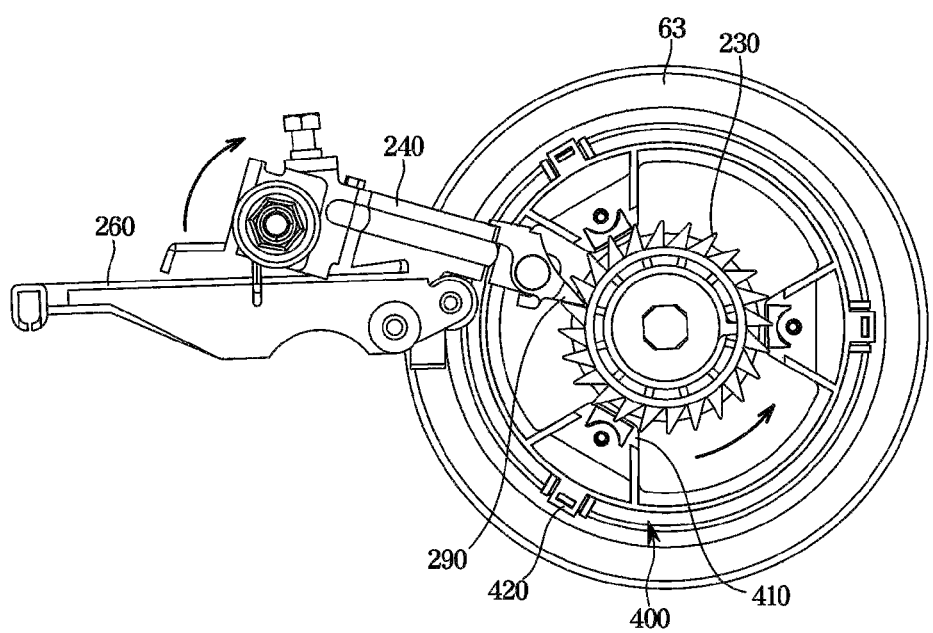
FIG. 22 is a view illustrating a state in which a sleeve clutch is rotated counter-clockwise by a lever clutch in a washing mode of a washing machine according to another embodiment of the present disclosure.
Figure 24:
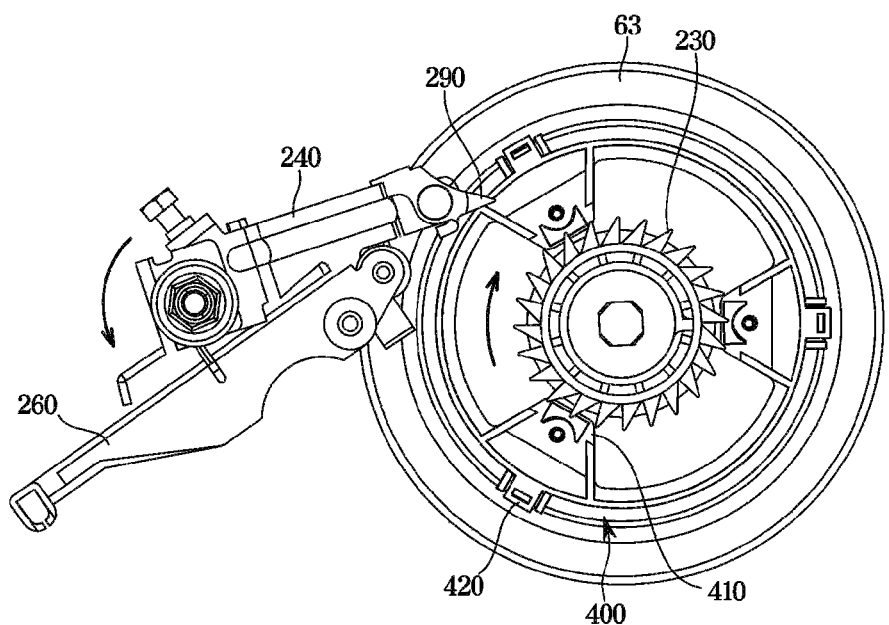
FIG. 24 is a view illustrating a state in which the sleeve clutch is rotated clockwise by the lever clutch in a dewatering mode of the washing machine according to another embodiment of the present disclosure.
Figure 25:
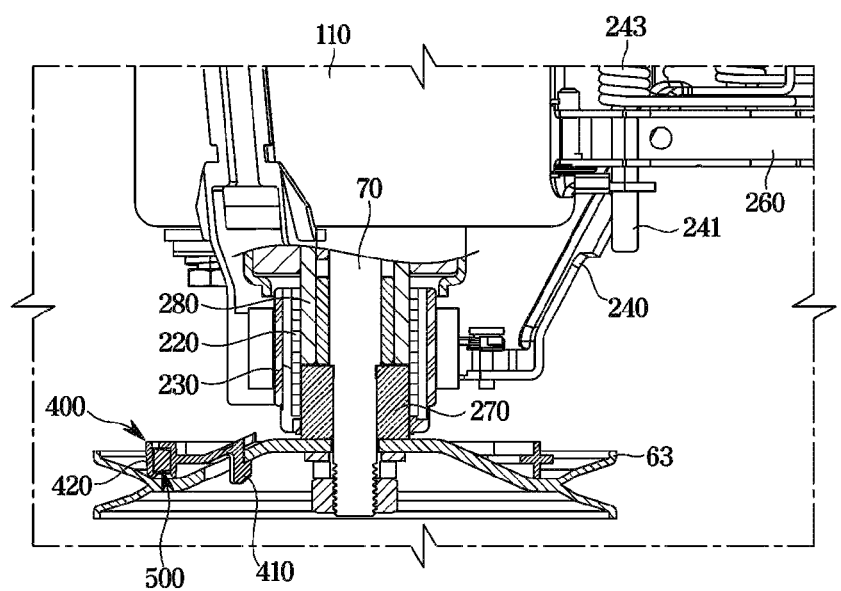
FIG. 25 is a view illustrating a state in which the inner diameter of the spring clutch decreases to connect the spring clutch to the clutch boss in the state of FIG. 24.

FIG. 22 is a view illustrating a state in which the sleeve clutch is rotated counter-clockwise by the lever clutch in a washing mode of the washing machine according to another embodiment of the present disclosure. FIG. 23 is a view illustrating a state in which the inner diameter of the spring clutch increases to separate the spring clutch from the clutch boss in the state of FIG. 22. FIG. 24 is a view illustrating a state in which the sleeve clutch is rotated clockwise by the lever clutch in the dewatering mode of the washing machine according to another embodiment of the present disclosure. FIG. 25 is a view illustrating a state in which the inner diameter of the spring clutch decreases to connect the spring clutch to the clutch boss in the state of FIG. 24.

As illustrated in FIGS. 22 and 23, in the washing mode of the washing machine, the washing machine may be in a state in which the arm clutch 290 coupled to the lever clutch 240 is in contact with the sleeve clutch 230 and rotates the sleeve clutch 230 counter-clockwise in a state in which the drain motor 250 (see FIG. 1) is stopped. Upon rotating the sleeve clutch 230 counter-clockwise, the inner diameter of the lower portion of the spring clutch 220 may increase. In response to an increase in the inner diameter of the lower portion of the spring clutch 220, the spring clutch 220 may be separated from the clutch boss 270. Upon separating the spring clutch 220 from the clutch boss 270, the clutch boss 270 and the case gear 280 may be separated from each other. Upon separating the clutch boss 270 from the case gear 280 and rotating the second pulley 63 using the driving motor 50 to rotate the washing shaft 70, the clutch boss 270 rotates with the washing shaft 70, but the rotation of the case gear 280 can be prevented. When the rotation of the case gear 280 is prevented, since the dewatering shaft 80 does not rotate, only the pulsator 40 connected to the washing shaft 70 may rotate so that the washing mode may be performed.

As illustrated in FIGS. 24 and 25, in the dewatering mode of the washing machine, the drain motor 250 (see FIG. 1) may be driven to rotate the lever clutch 240 about a rotary shaft 241 by the brake lever 260. Upon rotating the lever clutch 240 counter-clockwise about the rotary shaft 241, the arm clutch 290 coupled to the lever clutch 240 may be separated from the sleeve clutch 230, and the sleeve clutch 230 may rotate clockwise. Upon rotating the sleeve clutch 230 clockwise, the inner diameter of the lower portion of the spring clutch 220 may decrease. In response to a decrease in the inner diameter of the lower portion of the spring clutch 220, the clutch boss 270 and the case gear 280 may be connected by the spring clutch 220. Upon connecting the clutch boss 270 and the case gear 280 and rotating the second pulley 63 using the driving motor 50 to rotate the washing shaft 70, the case gear 280 may be rotated by the clutch boss 270 that rotates with the washing shaft 70. Upon rotating the case gear 280, the dewatering shaft 80 connected to the case gear 280 may rotate, and thus the washing shaft 70 and the dewatering shaft 80 may rotate at the same time. Upon rotating the washing shaft 70 and the dewatering shaft 80 at the same time, the pulsator 40 connected to the washing shaft 70 and the rotating tub 30 connected to the dewatering shaft 80 may rotate at the same time so that the dewatering mode may be performed.

When the dewatering mode is completely performed and switched to the washing mode, the drain motor 250 (see FIG. 1) may be stopped. Upon stopping the drain motor 250, as illustrated in FIG. 22, the lever clutch 240 may be rotated clockwise about the rotary shaft 241 by a lever spring 243. Upon rotating the lever clutch 240 clockwise about the rotary shaft 241, the arm clutch 290 coupled to the lever clutch 240 may be in contact with the sleeve clutch 230 to rotate the sleeve clutch 230 counter-clockwise. Upon rotating the sleeve clutch 230 counter-clockwise, as illustrated in FIG. 23, the inner diameter of the lower portion of the spring clutch 220 may increase, and the lower portion may be separated from the clutch boss 270. Upon separating the clutch boss 270 from the case gear 280 and rotating the second pulley 63 using the driving motor 50 to rotate the washing shaft 70, the clutch boss 270 rotates with the washing shaft 70, but rotation of the case gear 280 may be prevented. When the rotation of the case gear 280 is prevented, since the dewatering shaft 80 does not rotate, only the pulsator 40 connected to the washing shaft 70 may rotate so that the washing mode may be performed.

Figure 26:
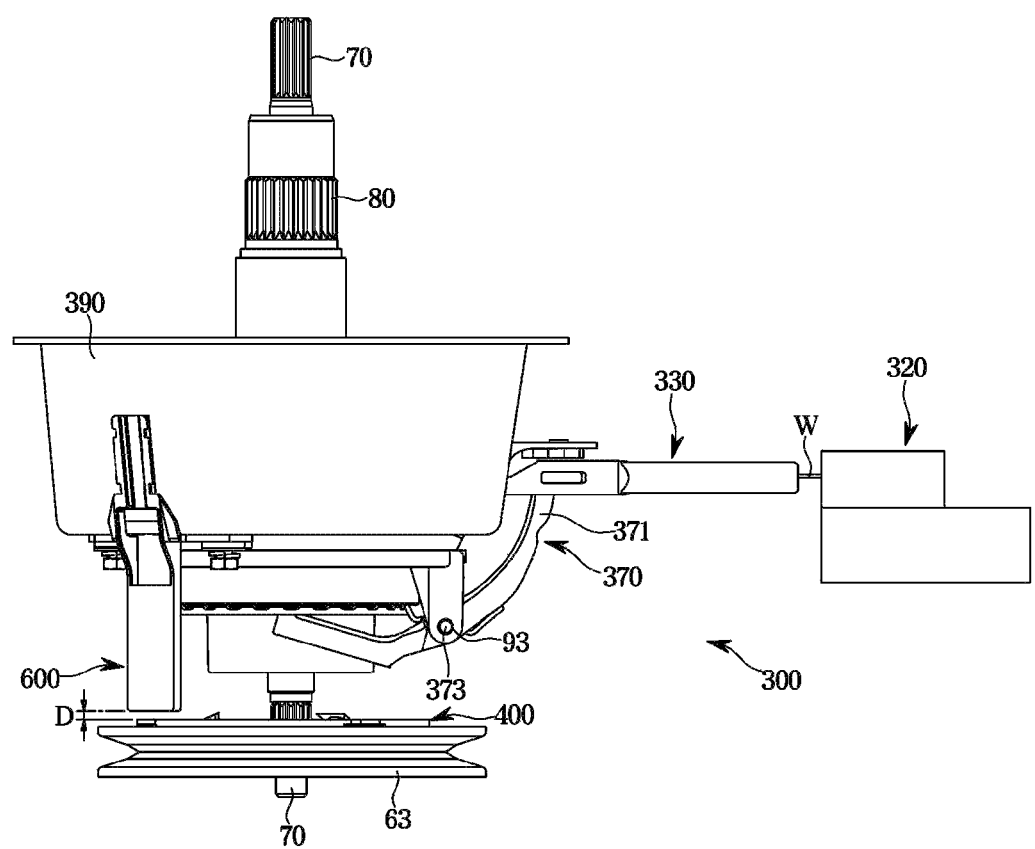
FIG. 26 is a view illustrating a clutch of a washing machine according to still another embodiment of the present disclosure.
Figure 27:
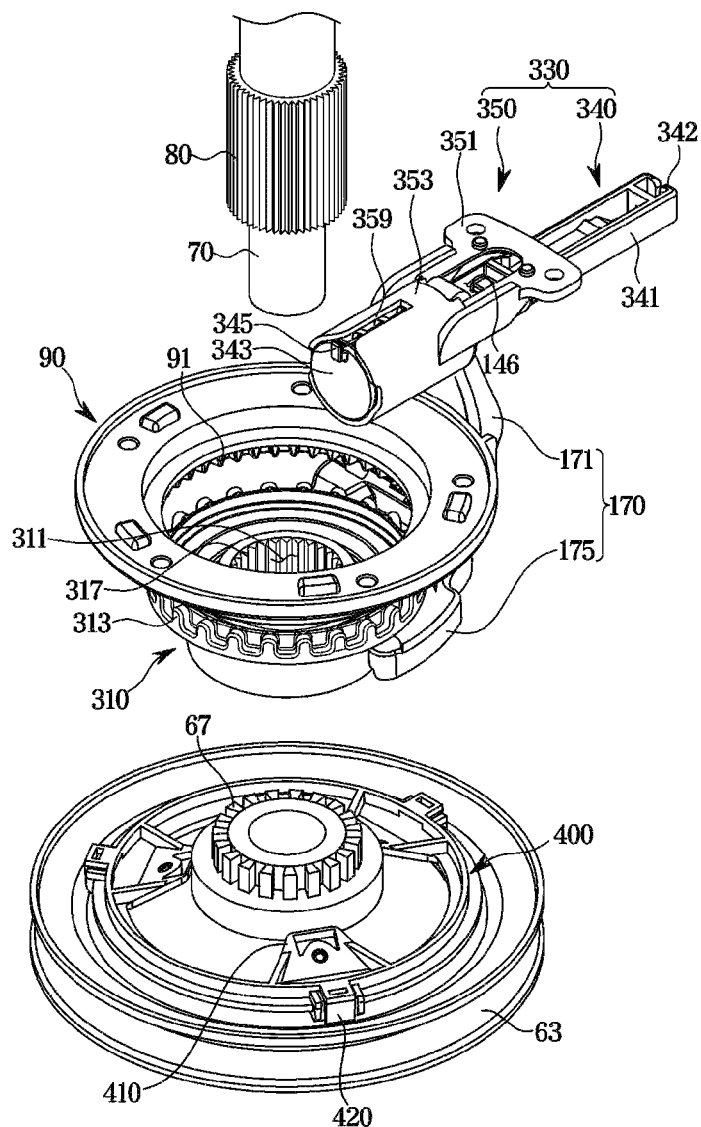
FIG. 27 is a view illustrating main components of the clutch according to still another embodiment of the present disclosure.
Figure 28:
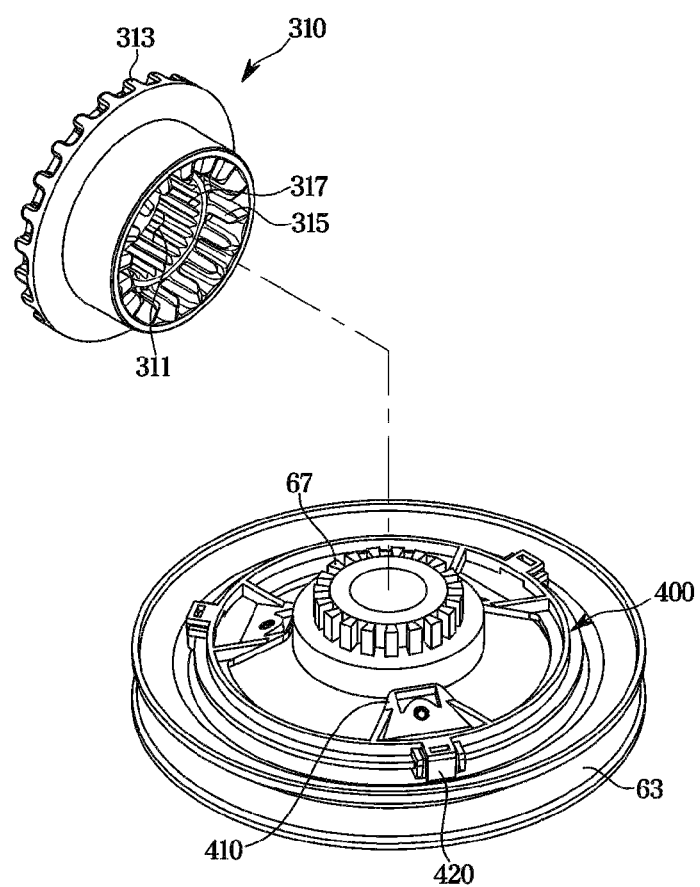
FIG. 28 is a view illustrating a process in which a couple ring and a pulley are connected according to still another embodiment of the present disclosure.
Figure 29:
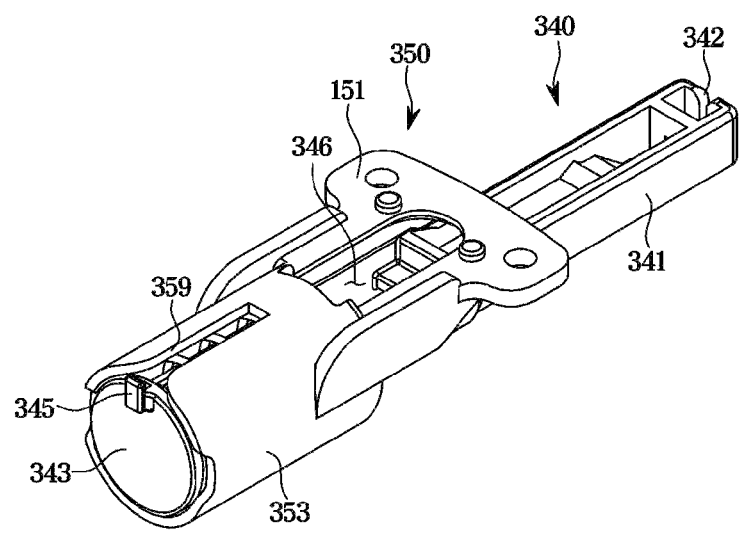
FIG. 29 is a view illustrating a link unit according to still another embodiment of the present disclosure.
Figure 30:
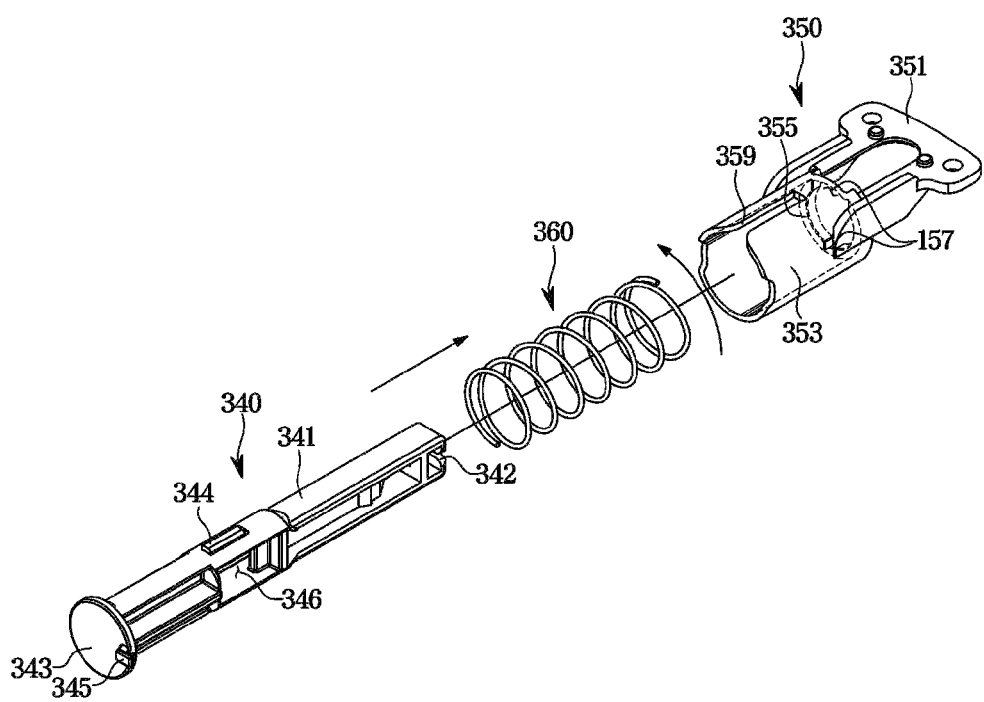
FIG. 30 is an exploded perspective view illustrating the link unit according to still another embodiment of the present disclosure.
Figure 31:
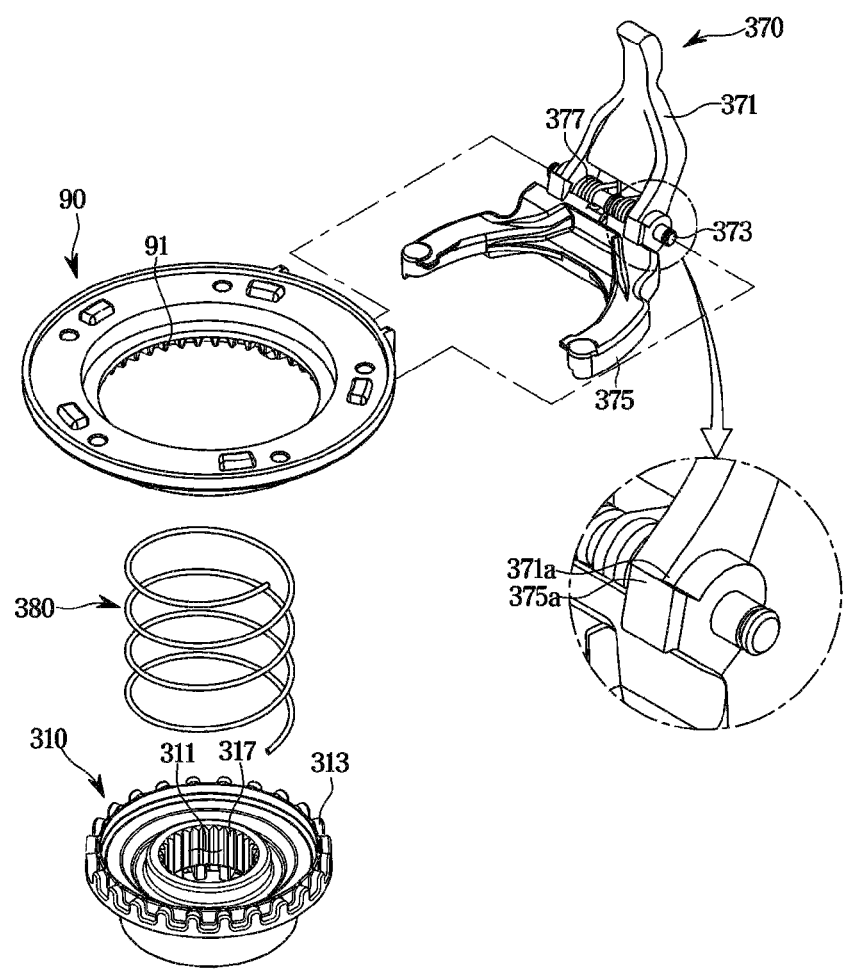
FIG. 31 is a view illustrating a process in which a rotation lever is coupled to a rotation stopper according to still another embodiment of the present disclosure.
Figure 32:
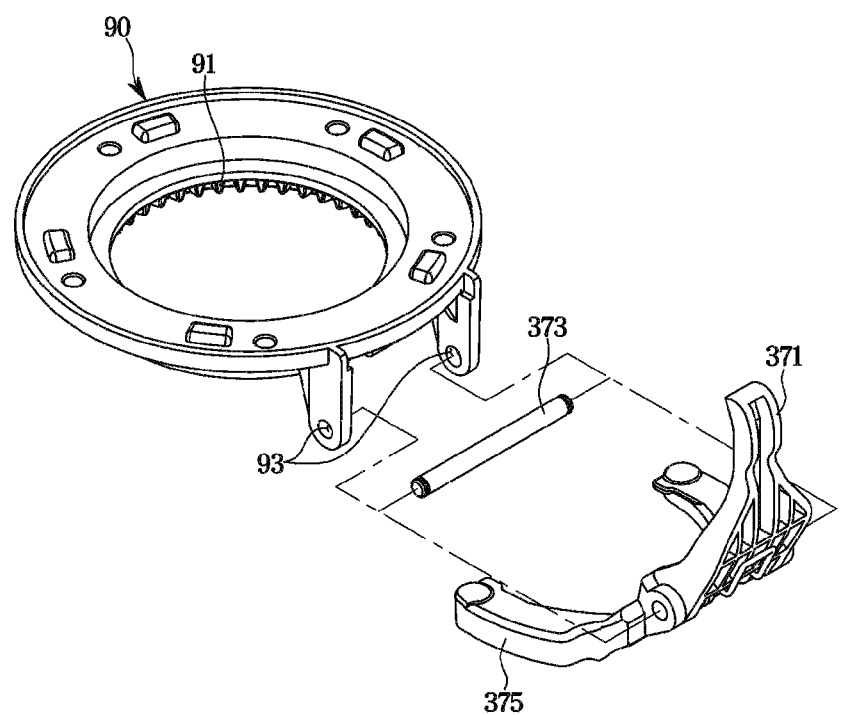
FIG. 32 is a view illustrating the process in which the rotation lever is coupled to the rotation stopper according to still another embodiment of the present disclosure.
Figure 33:
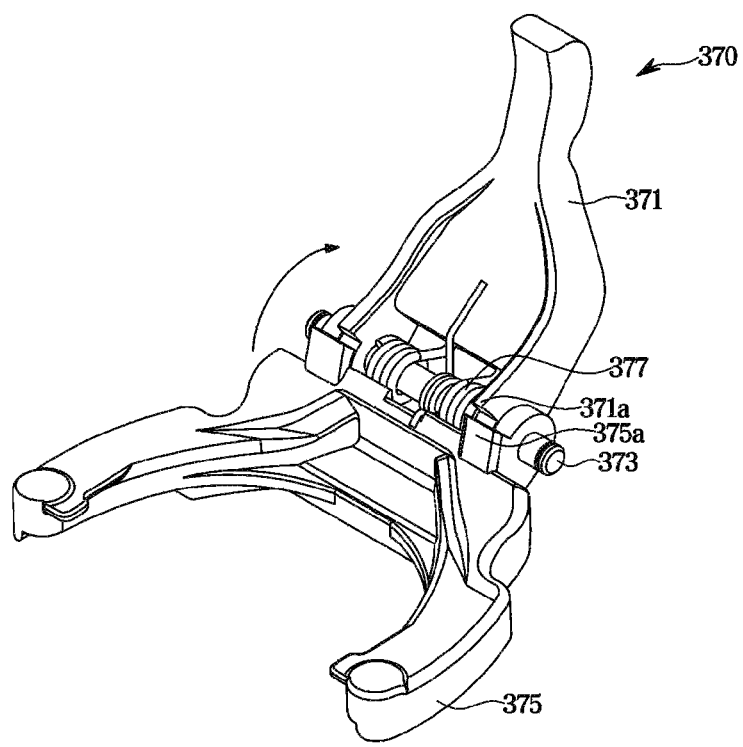
FIG. 33 is a view illustrating a state in which a first rotation lever of the rotation lever additionally rotates at a predetermined angle according to still another embodiment of the present disclosure.

FIG. 26 is a view illustrating a clutch of a washing machine according to still another embodiment of the present disclosure. FIG. 27 is a view illustrating main components of the clutch according to still another embodiment of the present disclosure. FIG. 28 is a view illustrating a process in which a couple ring and a pulley are connected according to still another embodiment of the present disclosure. FIG. 29 is a view illustrating a link unit according to still another embodiment of the present disclosure. FIG. 30 is an exploded perspective view illustrating the link unit according to still another embodiment of the present disclosure. FIG. 31 is a view illustrating a process in which a rotation lever is coupled to a rotation stopper according to still another embodiment of the present disclosure, and FIG. 32 is a view illustrating the process in which the rotation lever is coupled to the rotation stopper according to still another embodiment of the present disclosure. FIG. 33 is a view illustrating a state in which a first rotation lever of the rotation lever additionally rotates at a predetermined angle according to still another embodiment of the present disclosure.

As illustrated in FIGS. 26 to 33, a clutch 300 may include a couple ring 310 that moves vertically to selectively transmit a rotational force to a dewatering shaft 80, a clutch motor 320 for generating a tensile force in a radial direction of the couple ring 310, a link unit 330 that is connected to the clutch motor 320 and extends in the radial direction of the couple ring 310 upon applying power to the clutch motor 320, and a rotation lever 370 connected to the link unit 330 and rotated by the tensile force generated by the clutch motor 320 to move the couple ring 310 upward.

Since both of a configuration in which a bracket 400 to which a plurality of magnets 500 are fixed is detachably coupled to an upper portion of a second pulley 63 and a configuration in which a sensor unit 600 that detects the number of rotations of a driving motor 50 by detecting the magnets 500 is coupled to a housing 390 are the same as those illustrated in FIGS. 2 to 9, description thereof will be omitted.

The couple ring 310 may vertically move between a rotation stopper 90 and the second pulley 63 and selectively rotate the dewatering shaft 80. The couple ring 310 may include a through hole 311 through which a washing shaft 70 and the dewatering shaft 80 pass, first teeth 313 and second teeth 315 provided on an upper portion and a lower portion of the couple ring 310, and a serration 317 provided on an inner circumferential surface of the through hole 311.

The through hole 311 may be provided so that the washing shaft 70 and the dewatering shaft 80 pass through the through hole 311, the washing shaft 70 may be rotatably provided in the dewatering shaft 80 and connected to a pulsator 40, and a second serration 81 engaged with the first serration 317 provided on the inner circumferential surface of the through hole 311 may be provided on an outer circumferential surface of the dewatering shaft 80 so that the dewatering shaft 80 may be connected to a rotating tub 30. Since the washing shaft 70 is coaxially coupled to the second pulley 63, upon rotating the second pulley 63, the washing shaft 70 always rotates. However, since the dewatering shaft 80 is provided so that the first serration 317 of the couple ring 310 is engaged with the second serration 81 of the dewatering shaft 80, the dewatering shaft 80 may rotate with the couple ring 310 to rotate the rotating tub 30 only when the couple ring 310 rotates.

Upon moving the couple ring 310 downward, the couple ring 310 is in close contact with the second pulley 63, and thus a state in which the second teeth 315 provided on the couple ring 310 are engaged with power transmission teeth 67 provided on the second pulley 63 may be maintained. When the second teeth 315 are engaged with the power transmission teeth 67, and the second pulley 63 rotates, a rotational force of the second pulley 63 may be transmitted to the couple ring 310 so that the couple ring 310 may rotate. Upon rotating the couple ring 310, since the dewatering shaft 80 rotates to rotate the rotating tub 30, the rotating tub 30 and the pulsator 40 may rotate at the same time so that a dewatering mode may be performed.

Upon moving the couple ring 310 upward, the close contact between the couple ring 310 and the power transmission teeth 67 of the second pulley 63 is released, the rotational force of the second pulley 63 is not transmitted to the couple ring 310, the couple ring 310 is in close contact with the rotation stopper 90, and thus a state in which the first teeth 313 provided on the couple ring 310 are engaged with anti-rotation teeth 91 provided on the rotation stopper 90 may be maintained. Upon releasing the close contact between the couple ring 310 and the power transmission teeth 67 of the second pulley 63 and engaging the first teeth 313 and the anti-rotation teeth 91 at the same time, the rotation of the couple ring 310 is prevented, the rotation of the dewatering shaft 80 is also prevented, and thus a washing mode in which the rotating tub 30 does not rotate and only the pulsator 40 rotates may be performed.

The link unit 330 may be connected to the clutch motor 320 by a wire W and may transmit the tensile force generated by the clutch motor 320 to the rotation lever 370 so that the rotation lever 370 rotates. The link unit 330 may include a link 340 connected to the clutch motor 320 by the wire W, a guide 350 for guiding linear motion of the link 340, and a first return spring 360 for elastically supporting the link 340 by the guide 350.

The link 340 may include a body 341 linearly moved by the guide 350, a wire connector 342 provided at one end of the body 341 to be connected to the wire W, and a first support 343 provided at the other end of the body 341 to support one end of the first return spring 360. In the body 341, a plurality of anti-separation protrusions 344 for preventing the link 340 from being separated from the guide 350 after the link 340 is linearly movably inserted into the guide 350 and an insertion hole 346 through which one side of the rotation lever 370 is inserted and that rotates the rotation lever 370 by linear motion of the link 340. The first support 343 may support one end of the first return spring 360 and compress the first return spring 360 upon linearly moving the link 340 in the radial direction of the couple ring 310. An anti-rotation protrusion 345 for preventing the rotation of the first support 343 upon linearly moving the link 340 may be provide on the first support 343. The guide 350 may include a coupler 351 fixedly coupled to the housing 390 and a guide cylinder 353 that is provided in a hollow cylindrical shape and guides linear motion of the link 340. One side of the guide cylinder 353 may be provided so that an opening having a diameter greater than the first support 343 of the link 340 is formed so that the link 340 is inserted through the opening to linearly move. A second support 355 for supporting the other end of the first return spring 360 may be provided at the other side. The second support 355 may be provided to have an opening having a diameter smaller than the first support 343 to prevent the first support 343 of the link 340 from passing through the opening, may support the other end of the first return spring 360, and may restrict a range in which the link 340 linearly moves at the same time. Insertion grooves 357 of which the number corresponds to the plurality of anti-separation protrusions 344 and through which the anti-separation protrusions 344 of the link 340 inserted into the guide cylinder 353 pass may be provided in the second support 355. Accordingly, upon rotating the link 340 at a predetermined angle after the link 340 is inserted into the guide cylinder 353 so that the anti-separation protrusions 344 of the link 340 pass through the insertion grooves 357, the anti-separation protrusions 344 of the link 340 are hooked on the second support 355, and thus the link 340 cannot be separated in a direction opposite to a direction in which the link 340 is inserted. In the drawings, it is illustrated that two anti-separation protrusions 344 are provided, and two insertion grooves 357 are provided so that the number of the insertion grooves 357 corresponds to the anti-separation protrusions 344, but the present disclosure is not limited thereto. An anti-rotation guide groove 359 that prevents the rotation of the link 340 while the link 340 linearly moves may be provided in the guide cylinder 353. The anti-rotation guide groove 359 may be provided in a shape in which a groove is formed to extend from one open side of the guide cylinder 353 in a direction in which the link 340 linearly moves. Accordingly, after the link 340 is inserted into the guide cylinder 353 so that the anti-separation protrusions 344 of the link 340 pass through the insertion grooves 357, when the link 340 is rotated so that a position of the anti-rotation protrusion 345 corresponds to a position of the anti-rotation guide groove 359, the anti-separation protrusions 344 of the link 340 are hooked on the second support 355, the link 340 is not separated in the direction opposite to the direction in which the link 340 is inserted, and since the anti-rotation protrusion 345 is inserted into the anti-rotation guide groove 359 and linearly moved along the anti-rotation guide groove 359, the rotation of the link 340 can be prevented while the link 340 linearly moves.

In a state in which the first return spring 360 is accommodated in the guide cylinder 353 of the guide 350, one side of the first return spring 360 may be elastically supported by the first support 343 of the link 340. The other side may be elastically supported by the second support 355 of the guide 350. Accordingly, upon linearly moving the link 340 in the radial direction of the couple ring 310 by a tensile force generated by the clutch motor 320, the first return spring 360 may be compressed, and upon releasing the tensile force generated by the clutch motor 320, the first return spring 360 may linearly move the link 340 in a direction opposite to a direction in which the link 340 extends so that the link 340 may return to its original position before the tensile force is generated by the clutch motor 320.

Upon applying power to the clutch motor 320 to generate a tensile force, the rotation lever 370 may be rotated by the link 340, which linearly moves in the radial direction of the couple ring 310, to move the couple ring 310 upward. The rotation lever 370 may include a first rotation lever 371 of which one side is inserted into the insertion hole 346 of the link 340 and connected to the link 340, a rotary shaft 373 that is provided at the other side of the first rotation lever 371 so that the first rotation lever 371 is rotatably coupled to a rotation hole 93 provided in the rotation stopper 90, a second rotation lever 375 of which one side is rotatably connected to the rotary shaft 373, and the other side supports the couple ring 310, and a torsion spring 377 that is provided around the rotary shaft 373 and rotate the first rotation lever 371 and the second rotation lever 375 in directions in which the first rotation lever 371 and the second rotation lever 375 fold.

A first stopper 371a and a second stopper 375a that restrict a range in which the first rotation lever 371 and the second rotation lever 375 are rotated by the torsion spring 377 in the direction in which the first rotation lever 371 and the second rotation lever 375 fold may be provided on the first rotation lever 371 and the second rotation lever 375. Upon linearly moving the link 340 in the radial direction of the couple ring 310, the first rotation lever 371 may rotate clockwise about the rotary shaft 373. Upon rotating the first rotation lever 371 clockwise about the rotary shaft 373, since the second rotation lever 375 receives a force from the torsion spring 377, the second rotation lever 375 may rotate about the rotary shaft 373 in the clockwise direction like the first rotation lever 371.

Upon applying power to the clutch motor 320 to generate a tensile force, since the second rotation lever 375 rotates clockwise about the rotary shaft 373, the couple ring 310 supported by the second rotation lever 375 may move upward.

As described above, since the tensile force generated by the clutch motor 320 is directly transmitted to the link 340 and linearly moves the link 340, the tensile force may be transmitted to the rotation lever 370 to rotate the rotation lever 370 without loss. In addition, since the rotation lever 370 moves the couple ring 310 upward using a rotational force, the tensile force generated by the clutch motor 320 may be converted to the rotational force of the rotation lever 370 to move the couple ring 310 upward without loss.

In a state in which the couple ring 310 has moved upward and the couple ring 310 and the rotation stopper 90 are in close contact with each other, the close contact between the couple ring 310 and the rotation stopper 90 may be released due to vibrations or the like during washing. In order to prevent this, the second rotation lever 375 rotated by the torsion spring 377 may continuously push the couple ring 310 upward by additionally rotating the first rotation lever 371 at a predetermined angle even in a state in which the couple ring 310 and the rotation stopper 90 are in close contact with each other, and the first teeth 313 of the couple ring 310 are engaged with the anti-rotation teeth 91 of the rotation stopper 90.

Figure 34:
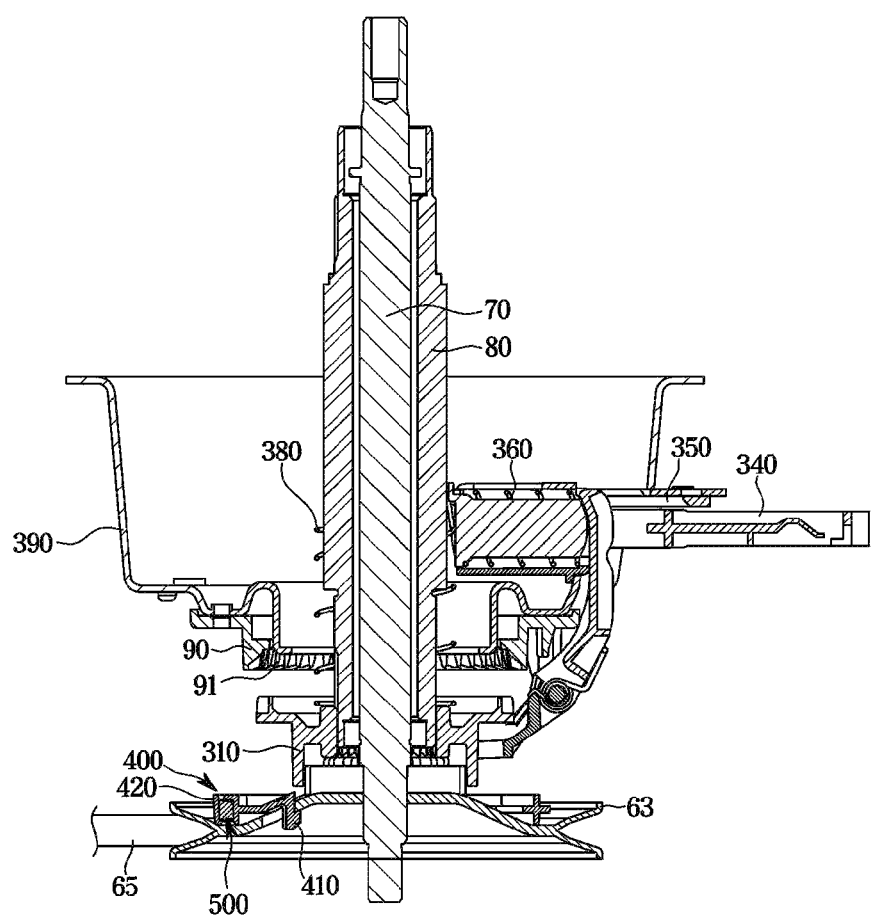
FIG. 34 is a view illustrating an operation state in the dewatering mode of the washing machine according to still another embodiment of the present disclosure.
Figure 35:
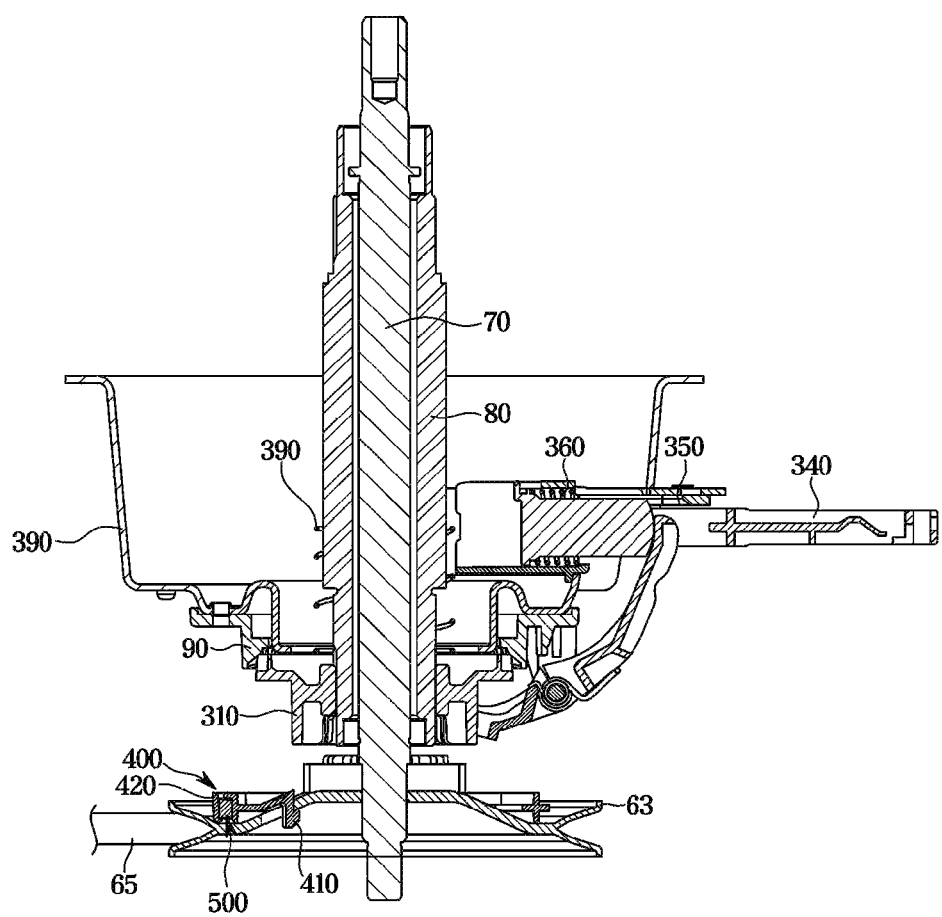
FIG. 35 is a view illustrating an operation state in a washing mode of the washing machine according to still another embodiment of the present disclosure.

FIG. 34 is a view illustrating an operation state in the dewatering mode of the washing machine according to still another embodiment of the present disclosure. FIG. 35 is a view illustrating an operation state in the washing mode of the washing machine according to still another embodiment of the present disclosure.

In an initial state in which power is not applied to the clutch motor 320, as illustrated in FIG. 34, the link 340 may receive a force in a direction opposite to the radial direction of the couple ring 310 from the first return spring 360, and thus the first rotation lever 371 and the second rotation lever 375 may receive a force that rotates the first rotation lever 371 and the second rotation lever 375 counter-clockwise about the rotary shaft 373. Since the second rotation lever 375 receives the force to be rotated counter-clockwise about the rotary shaft 373, the couple ring 310 may not receive a vertical force from the second rotation lever 375 and may be moved downward by a second return spring 380 provided between the rotation stopper 90 and the couple ring 310 and in close contact with the second pulley 63.

In the state in which the couple ring 310 is in close contact with the second pulley 63, since the second teeth 315 of the couple ring 310 and the power transmission teeth 67 of the second pulley 63 are engaged, a rotational force of the second pulley 63 may be transmitted to the couple ring 310 and may rotate the couple ring 310. The couple ring 310 may rotate the dewatering shaft 80.

Since the washing shaft 70 may be coaxially coupled to the second pulley 63 and may always rotate with the second pulley 63, in a state in which power is not applied to the clutch motor 320, the dewatering mode in which the washing shaft 70 and the dewatering shaft 80 rotate at the same time may be performed.

Upon applying power to the clutch motor 320 and generating a tensile force using the clutch motor 320, as illustrated in FIG. 35, the link 340 connected to the clutch motor 320 through the wire W may extend and linearly move in the radial direction of the couple ring 310. Upon moving the link 340 linearly in the radial direction of the couple ring 310, the first rotation lever 371 of which one side is connected to the link 340 may rotate clockwise about the rotary shaft 373. Upon rotating the first rotation lever 371 clockwise about the rotary shaft 373, since the second rotation lever 375 receives a force from the torsion spring 377 in the direction in which the second rotation lever 375 fold s toward the first rotation lever 371, the second rotation lever 375 may rotate clockwise about the rotary shaft 373 like the first rotation lever 371. Upon rotating the second rotation lever 375 clockwise about the rotary shaft 373, the other side of the second rotation lever 375 for supporting the couple ring 310 may transmit a vertical force to the couple ring 310 so that the couple ring 310 moves upward. When the couple ring 310 receives the vertical force and moves upward, the close contact between the couple ring 310 and the second pulley 63 is released, the engagement between the second teeth 315 of the couple ring 310 and the power transmission teeth 67 of the second pulley 63 is released, and thus a rotational force of the second pulley 63 may not be transmitted to the couple ring 310. In addition, when the couple ring 310 moves upward and the couple ring 310 and the rotation stopper 90 are in close contact with each other, the first teeth 313 of the couple ring 310 and the anti-rotation teeth 91 of the rotation stopper 90 may be engaged so that rotation of the couple ring 310 may be prevented. Since the rotation of the couple ring 310 is prevented, the washing mode in which the dewatering shaft 80 does not rotate and only the washing shaft 70 coaxially coupled to the second pulley 63 rotates may be performed.

Upon releasing the power applied to the clutch motor 320, the link 340 is linearly moved by the first return spring 360 in the direction opposite to the radial direction of the couple ring 310, the first rotation lever 371 rotates counter-clockwise about the rotary shaft 373, and upon rotating the first rotation lever 371, in a state in which the first stopper 371*a* and the second stopper 375*a* are in contact with each other, the second rotation lever 375 may rotate counter-clockwise about the rotary shaft 173. Upon rotating the second rotation lever 375 counter-clockwise about the rotary shaft 373 and releasing a force that pushes the couple ring 310 upward, the couple ring 310 is moved downward by the second return spring 380, and thus the dewatering mode in which the washing shaft 70 and the dewatering shaft 80 rotate at the same time may be performed.

A specific shape and a specific direction of a washing machine have been described above with reference to the accompanying drawings, but the present disclosure may be variously modified and changed by those skilled in the art, and the modifications and changes should be interpreted as being included in the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A washing machine comprising:
   a water tank provided to store washing water in a cabinet;
   a rotating tub rotatably provided in the water tank;
   a pulsator provided in the rotating tub and rotated by a washing shaft;
   a driving motor configured to generate a rotational force for rotating the washing shaft;
   a clutch configured to selectively transmit the rotational force generated by the driving motor to a dewatering shaft for rotating the rotating tub and includes a housing through which the washing shaft and the dewatering shaft pass;
   a pulley including a first pulley rotated by the driving motor and a second pulley connected to the washing shaft and connected to the first pulley by a belt, and configured to rotate the washing shaft;
   a bracket coupled to the second pulley and to which magnets are fixed; and
   a sensor unit which is coupled to the housing and configured to detect a number of rotations of the driving motor by detecting the magnets.

2. The washing machine of claim 1, wherein the bracket is provided in a ring shape and includes a plurality of hooks detachably coupled to the second pulley and a plurality of magnet mounts formed along an edge of the bracket and to which the magnets are fixed.

3. The washing machine of claim 2, wherein each of the magnets is provided in a trapezoidal shape having a short side and a long side and detachably fixed to one of the plurality of magnet mounts.

4. The washing machine of claim 3, wherein each of the magnets is fixed to one of the plurality of magnet mounts so that the short side is oriented toward a center of the bracket.

5. The washing machine of claim 1, wherein the magnets are fixed to the bracket to be positioned on the second pulley.

6. The washing machine of claim 5, wherein the sensor unit includes:
   a coupler including a plurality of coupling holes coupled to the housing;
   a sensor mount that extends from the coupler toward the second pulley; and
   a sensor fixed to the sensor mount and configured to detect the magnets.

7. The washing machine of claim 6, wherein the sensor is fixed to an end of the sensor mount to be positioned on the bracket.

8. The washing machine of claim 7, wherein a distance between the sensor and the magnet is in a range from 2 to 4 mm.

9. The washing machine of claim 1, wherein the clutch includes:
   a spring clutch having an inner diameter that decreases or increases to selectively transmit a rotational force to the dewatering shaft;
   a sleeve clutch provided to surround an outer circumferential surface of the spring clutch, and configured to:
   rotate in two directions, and
   decrease or increase the inner diameter of the spring clutch;
   a lever clutch configured to rotate the sleeve clutch in the two directions; and
   a brake lever driven by a drain motor and configured to rotate the lever clutch to rotate the sleeve clutch in the two directions.

10. The washing machine of claim 9, wherein the clutch further includes:
    a clutch boss accommodated at an inner lower end of the spring clutch and connected to the washing shaft; and
    a case gear accommodated at an inner upper end of the spring clutch to be disposed on the clutch boss and connected to the dewatering shaft.

11. The washing machine of claim 10, wherein the sleeve clutch includes:
    a first sleeve clutch provided to surround a lower end portion of the outer circumferential surface of the spring clutch and configured to connect to or disconnect from the clutch boss according to a decrease or increase in inner diameter of a lower end portion of the spring clutch; and
    a second sleeve clutch provided to surround an upper end portion of the outer circumferential surface of the spring clutch and configured to connect to or disconnect from the case gear according to a decrease or increase in inner diameter of an upper end portion of the spring clutch.

12. The washing machine of claim 11, wherein the clutch further includes an arm clutch including:
    a first arm clutch coupled to the lever clutch and configured to rotate the first sleeve clutch, and
    a second arm clutch coupled to the lever clutch and configured to rotate the second sleeve clutch.

13. The washing machine of claim 10, wherein the sleeve clutch is provided to surround a lower end portion of the outer circumferential surface of the spring clutch and configured to connect to or disconnect from the clutch boss according to a decrease or increase in inner diameter of a lower end portion of the spring clutch.

14. The washing machine of claim 13, wherein an upper end portion of the spring clutch is connected to the case gear while maintaining a state in which an inner diameter of the upper end portion of the spring clutch decreases.

15. The washing machine of claim 14, wherein the clutch further includes an arm clutch coupled to the lever clutch and configured to rotate the sleeve clutch.

* * * * *